United States Patent
Sukegawa et al.

(10) Patent No.: US 6,651,617 B2
(45) Date of Patent: Nov. 25, 2003

(54) METHOD OF CONTROLLING IGNITION TIMING OF COMPRESSION IGNITION ENGINE OF PREMIXED MIXTURE TYPE

(75) Inventors: Yoshihiro Sukegawa, Hitachi (JP); Shiro Yamaoka, Hitachi (JP); Yusuke Kihara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/208,843

(22) Filed: Aug. 1, 2002

(65) Prior Publication Data

US 2003/0056752 A1 Mar. 27, 2003

Related U.S. Application Data

(63) Continuation of application No. 10/084,048, filed on Feb. 28, 2002.

(30) Foreign Application Priority Data

Sep. 26, 2001 (JP) ........................................ 2001-294738

(51) Int. Cl.⁷ ................................................. F02B 9/02
(52) U.S. Cl. .................... 123/305; 123/295; 123/298; 123/435; 701/105
(58) Field of Search ................. 123/305, 435, 123/295, 298; 701/105

(56) References Cited

U.S. PATENT DOCUMENTS

| | | | |
|---|---|---|---|
| 6,161,518 A | * 12/2000 | Nakakita et al. | 123/298 |
| 2001/0025621 A1 | * 10/2001 | Shiraishi et al. | 123/305 |
| 2002/0007817 A1 | * 1/2002 | Ueda et al. | 123/295 |
| 2002/0026924 A1 | * 3/2002 | Morikawa et al. | 123/305 |
| 2002/0050266 A1 | * 5/2002 | Okamoto et al. | 123/298 |
| 2002/0129785 A1 | * 9/2002 | Tetsuno et al. | 123/295 |

FOREIGN PATENT DOCUMENTS

| | | |
|---|---|---|
| JP | 10-238374 | 9/1998 |
| JP | 2000-220482 | 8/2000 |
| JP | 2000-227027 | 8/2000 |
| JP | 2000-265867 | 9/2000 |

\* cited by examiner

Primary Examiner—Erick Solis
(74) Attorney, Agent, or Firm—McDermott, Will & Emery

(57) ABSTRACT

Provided is a method of controlling the timing of ignition of a compression ignition internal combustion engine of a premixed mixture type in which a premixed gas is self-ignited through compression by a piston, the volume of fuel spray impinging upon the inner wall surface of a combustion chamber is continuously or stepwise increased as the engine speed is changed from a low value to a high value, and which can optimumly control the timing of compression ignition in accordance with an operating condition of the engine at a low cost without complicating the apparatus configuration.

4 Claims, 17 Drawing Sheets

METHOD OF CONTROLLING IGNITION TIMING OF COMPRESSION IGNITION ENGINE OF PREMIXED MIXTURE TYPE

RELATED APPLICATION

This application is a continuation of U.S. patent application Ser. No. 10/084,048, filed Feb. 28, 2002.

BACKGROUND OF THE INVENTION

1. Field of the Invention

The present invention related to a compression ignition internal combustion engine of a premixed mixture type, and in particular to a method of controlling ignition timing of a compression ignition engine of a premixed mixture type, which can optimumly control the timing of compression ignition.

2. Related Art

These years, there has been proposed a compression ignition internal combustion engine of a premixed mixture, which utilizes a combustion system for compressing homogenous premixed gas so as to cause self-ignition of the premixed gas. This engine can carry out its operation in an ultra lean mixture range (in which the air-fuel ratio is higher than 80%), which cannot be carried by a conventional gasoline or Diesel engine, and accordingly, the flame temperature can be lowered and the homogenous mixture gas can carry out ignition and combustion by itself. Thus, this engine can greatly reduce emission of both NOx and soot.

In general, when premixed gas is compressed so as to raise its temperature to a given value, the so-called low temperature oxidation reaction is initiated by dehydrogenation of hydrocarbon as a fuel. After the low temperature oxidation reaction is progressed, self-ignition of the premixed gas occurs by way of the so-called blue flame elementary reaction. Since this self-ignition phenomenon simultaneously occurs at multiple points in the mixture gas, the period of combustion as viewed in the entire combustion chamber is extremely shorter than that by spark ignition (simple point ignition) in a conventional gasoline engine or that of spray combustion in a Diesel engine. This fact results in restraint of production of NOx which depends upon the temperature of flame and the duration thereof, and accordingly, it mainly realizes reduction of NOx in the compression ignition internal combustion engine.

The combustion period in a conventional spark ignition engine which depends upon flame propagation caused after spark ignition by a spark plug tends to become shorter as the engine speed becomes higher. This is because the intensity of turbulence in an air stream created within the combustion chamber becomes higher as the engine speed increases, and as a result, the area of the surface of the flame (the reaction area) increases. Accordingly, in the spark ignition engine, the heat generation crank angle which can exhibit a time of heat generation can be maintained to be substantially constant, irrespective of its engine speed.

On the contrary, in a compression ignition engine of a premixed mixture type, it has been known that the self-ignition phenomenon is caused simultaneously at multiple points in the mixture gas, and accordingly, the combustion period is extremely shorter than that of the spark ignition engine, and is substantially constant, irrespective of an engine speed. This is because the fuel is burnt through compression ignition so that the combustion occur simultaneously over the entire area of the combustion chamber through the compression of ignition of premixed mixture gas, and accordingly, no flame surface is present so that it cannot hardly be affected by a gas stream. Accordingly, in the compression ignition engine of a premixed mixture type, the heat generation crank angle varies, depending upon an engine speed, that is, the lower the engine speed, the longer the combustion crank angle, and vise versa.

A reciprocating engine which carries out Otto cycle which is representative of gasoline engines, exhibits a highest degree of thermal efficiency around the top dead center of compression at which the heat generation becomes maximum. In the case of the compression ignition engine of a premixed mixture type, since the self-ignition phenomenon is effected at multiple points in mixture gas so that the period of combustion is substantially constant, irrespective of an engine speed, the crank angle at which the heat generation is maximum varies, depending upon an engine speed, and accordingly, the crank angle at which the heat generation is maximum becomes out of a zone around the top dead center, depending upon an engine speed. Accordingly, in the compression ignition engine of a premixed mixture type, it is required to precisely control the ignition timing so as to obtain a maximum value of heat generation around the top dead center of compression at every engine speed in order to maximize the thermal efficiency.

However, in the case of the compression ignition engine of a premixed mixture type, since there is used the self ignition through which mixture gas in the combustion chamber is self-ignited by compression heat that is produced when the mixture gas is compressed by a piston, without using a spark plug, in a range of compression ignition of premixed mixture gas, the control of the ignition timing with a high degree of accuracy is difficult in comparison with control of spark ignition through which the supply of power to a spark plug is controlled as in the case of a spark ignition engine.

In order to solve the above-mentioned problems, JP-A-2000-220482, as prior art, proposes a method of controlling the timing of compression ignition by liquid which can absorb latent heat from premixed gas after the mixing volume of the liquid is adjusted since the timing of compression ignition can be controlled by the liquid which is mixed in the premixed gas so as to absorb latent heat from the latter upon evaporation thereof.

Further, JP-A-2000-265867 proposes a method in which there is provided such a configuration that the timing of compression ignition can be detected during operation cycle of an engine, and control gas which has a specific heat ratio different from that of the premixed gas and which does not react in the combustion chamber can be fed into the combustion chamber, and accordingly, the supply volume of the control gas to be fed into the combustion chamber is controlled in accordance with a detected ignition timing.

Further, JP-A-2000-227027 proposes a method of controlling the timing of compression ignition in which the timing of compression ignition can be detected during operation cycle of an engine while a means for controlling the temperature of intake air is provided in a part upstream of an intake port, and accordingly, the timing of ignition is controlled by controlling the temperature of intake air fed into the combustion chamber in accordance with a detected timing of ignition.

Further, JP-A-10-238374 proposes a method in which there are provided an ignition fuel injector which starts ignition within a combustion chamber in association with an ignition timing in the combustion chamber, a compression ratio changing mechanism for changing the volume of the combustion chamber so as to change the compression ratio and a control means for adjusting the volume of premixed mixture fuel and the compression ratio in accordance with a load condition of the internal combustion engine, and accordingly, the compression ratio is changed in accordance with a volume of premixed mixture which depends upon a load condition while ignition fuel is fed in association with an ignition timing so as to start the combustion.

However, the above-mentioned prior art examples have raised problems as stated below:

In the method disclosed in the JP-A-2000-220482, since the timing of compression ignition is controlled by mixing the liquid for absorbing latent heat of evaporation, into the mixture gas, a pump for charging the liquid, a tank for reserving the liquid, and a control valve for controlling the charge volume of the liquid are required in addition to a conventional engine, and accordingly, there are presented problems of increased costs, requirement of a space for attachment of the above-mentioned equipment, and complication in the periodical replenishment of the liquid.

Further, in a method disclosed in the JP-A-2000-265867, since the timing of compression ignition is controlled by mixing control gas into mixture gas, a pump for charging the control gas, a tank for reserving the gas and a control valve for controlling the volume of the control gas are required in addiction to a conventional engine, and accordingly, there are presented problems of increased costs, requirement of a space for attachment of the above-mentioned equipment, and complication in the periodical replenishment of the control gas.

Further, in the method disclosed in the JP-A-2000-227027, since the temperature of intake air fed into a combustion chamber is controlled so as to control the timing of compression ignition, a means for controlling the temperature of the intake air is required in addition to a conventional engine, there are presented problems of increased costs, and requirement of a space for attachment of the above-mentioned equipment. Further, since a means for heating or cooling the intake air is provided to the intake port, there is presented such a problem that the control of the timing of self-ignition with a high degree of accuracy becomes difficult due to a response lag in the temperature of the intake air.

Further, in the method disclosed in the JP-A-10-238374, since the compression ratio is changed in accordance with a volume of premixed fuel which depends upon a load condition while ignition fuel is fed in association with an ignition timing, the configuration for changing the compression ratio of the combustion chamber becomes complicated, and accordingly, there are presented problems of lowering of reliability and increased costs.

SUMMARY OF THE INVENTION

An object of the present invention is to provide a method of controlling the timing of ignition of a compression ignition engine of a premixed mixture type, which can optimumly control the timing of compression ignition in association with an operating condition of the engine at a low cost without complicating the configuration thereof.

The essential feature of the present invention is the provision of a compression ignition engine of a premixed mixture type in which premixed gas is self-ignited through compression by a piston, with a method in which the volume of sprayed fuel impinging upon the inner wall surface of a combustion chamber is continuously or stepwise increased as the engine speed varies from a low speed to a high speed in a compression ignition operating range.

Another essential feature of the present invention is to provide a compression ignition engine of a premixed mixture type in which premixed gas is self-ignited through compression by a piston, with a method in which a fuel injector for injecting fuel into an intake port for feeding air into a combustion chamber is provided, and the fuel injection timing of sprayed fuel adapted to be injected into the intake port from the fuel injector is continuously or stepwise advanced from intake stroke injection to compression stroke injection as the engine speed varies from a low speed to a high speed in a compression ignition operating range.

Further another essential feature of the present invention is to provide a compression ignition engine of a premixed mixture type in which premixed gas is self-ignited through compression by a piston, with a method in which there are provided a pressure sensor for detecting a pressure in a combustion chamber and a crank angle sensor for detecting a rotating angle of a crank shaft, the timing of ignition is controlled so that a maximum value of pressure in the combustion chamber, which is detected by the pressure sensor, is obtained in a crank angle range from 10 to 15 deg. after the top dead center of compression, in a compression ignition operating range.

The present invention will be detailed in the form of preferred embodiments with reference to the accompanying drawings in which:

DESCRIPTION OF THE PREFERRED EMBODIMENTS

Explanation will be hereinbelow made of embodiments of the present invention with reference to the accompanying drawings.

Figure 1:
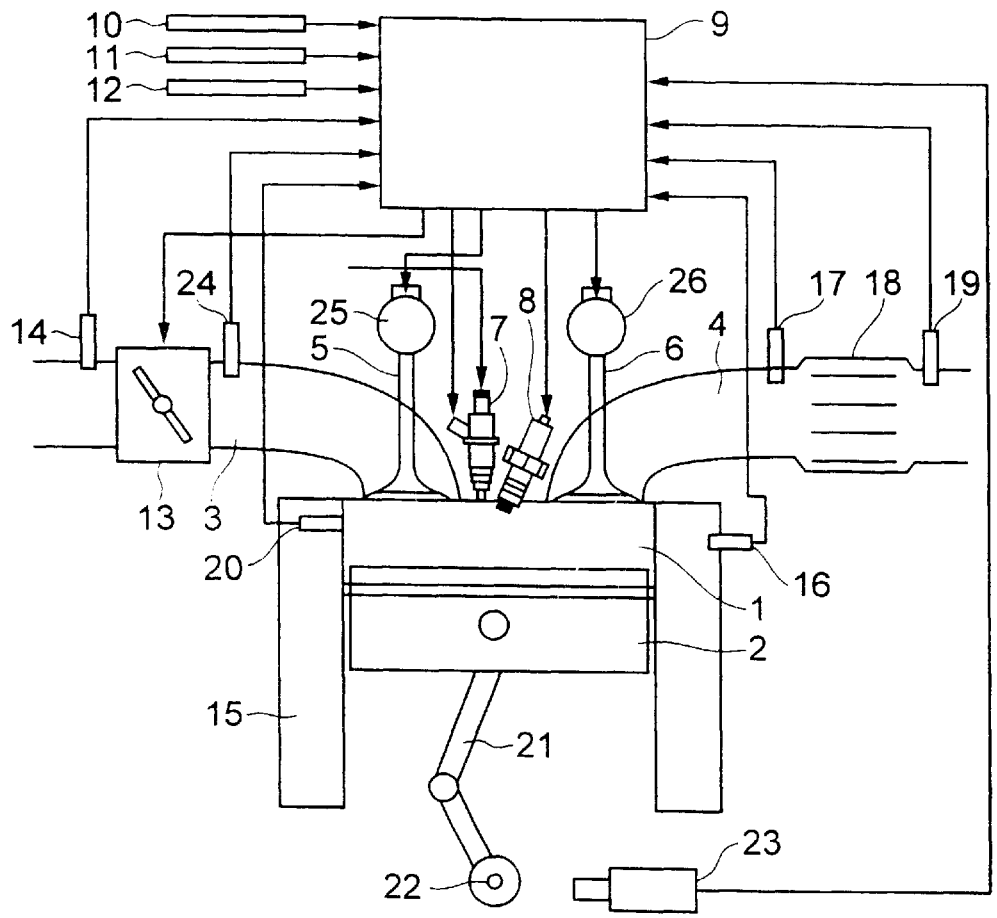
FIG. 1 is a schematic view illustrating a compression ignition internal combustion engine in its entirety to which a method of controlling the timing ignition for a compression ignition engine of a premixed mixture type, according to the present invention, is applied.

FIG. 1 is a view illustrating a configuration of a compression ignition internal combustion engine in an embodiment of a method of controlling the timing of ignition of a compression ignition engine of a premixed mixture type according to the present invention.

Figure 2:
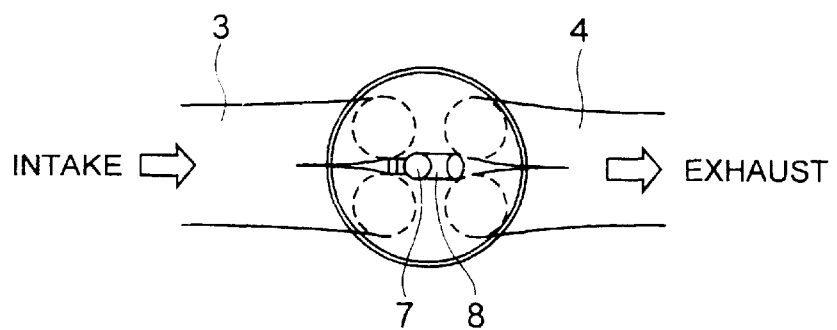
FIG. 2 is a plan view showing relationship among a combustion changer, an intake port and an exhaust port which are shown in FIG. 1.

Referring to FIG. 1, the compression ignition internal combustion engine has a combustion chamber 1 into which a mixture of air and fuel is sucked through an intake port 3 by a piston 2 moving downward, and the sucked mixture is compressed by the piston 2 moving upward and is then exploded so as to abruptly depress the piston 2 downward. In this combustion chamber 1 is communicated thereto with an intake port 3 and an exhaust port 4 as clearly shown in FIG. 2. Further, the passages to the combustion chamber 2 are opened and closed by an intake valve 5 in the intake port 3 and by an exhaust valve 6 in the exhaust port 4, that is, the intake valve 5 and the exhaust valve 6 are used as passage opening and closing means for the combustion chamber, respectively.

A fuel injection valve 7 and a spark plug 8 are provided in the combustion chamber 1. This fuel injection valve 7 is located in the upper part of the combustion chamber 1 in order to directly inject fuel into the combustion chamber 1, having its injection nozzle 2 opposed to the piston 2. It is noted that there may be used such a cylinder injection type that the fuel injection valve 7 is located in a bifurcated part of the intake port so that its injection nozzle is directed oblique to the surface of the piston 2.

Further, the spark plug 8 is adapted to carry out spark discharge when an engine control unit (which will be hereinbelow referred to "ECU") 9 instructs spark ignition combustion. This ECU 9 receives output values from an accelerator opening degree detecting device 10, a brake depression force detecting device 11 and a vehicle speed detecting device 12. This accelerator opening degree detecting device 10 is provided to an accelerator so as to detect an engine load. Further, the brake depression force detecting device 11 is provided in a brake so as to detect a depression force of the brake. This accelerator opening degree detecting device 10 and the brake depression force detecting device 11 constitutes a driver's intention detecting means for detecting an intention owned by a driver driving a vehicle. That is, this driver's intention detecting means is adapted to determine what load is required, on the engine side. Further, the vehicle speed detecting device 12 is adapted to detect a vehicle speed of an automobile so as to constitute a vehicle running condition detecting means for detecting a running condition of the vehicle or automobile.

Further, the intake port 3 is provided therein with an intake air volume adjusting device (throttle valve) 13 for adjusting the volume of air fed through the intake port 3. The intake port 3 is provided therein, upstream of the intake air volume adjusting device 13, with an air flow sensor 14 for detecting a temperature of air fed through the intake port 2. Further, an engine cooling water temperature sensor 16 for detecting a temperature of cooling water flowing through a water jacket laid around a cylinder block 15 so as to cool the engine is provided in the vicinity of the combustion chamber 1.

Further, the exhaust port 4 is provided with an air-fuel ratio sensor 17. This air-fuel ratio sensor 17 is adapted to detect an air-fuel ratio of exhaust gas in the exhaust port 4. Further, catalyst 18 is installed in the exhaust port 4, downstream of the air-fuel ratio sensor 17. Further, a catalyst downstream exhaust temperature sensor 19 is arranged downstream of the catalyst 18. Further, the combustion chamber 1 is provided therein with a pressure sensor 20 which is adapted to measure a pressure in the combustion chamber 1, having such a responsiveness that a crank angle upon peak pressure in the combustion chamber 1 can be detected within 1 deg. at a highest engine speed in a compression ignition operating mode in which the engine has been previously set. Further, the piston 2 is attached thereto with a connecting rod 21 which is in turn rotatably attached to a crank shaft 22. A crank angle sensor 23 for detecting a crank angle of the engine is provided in the vicinity of this crank shaft 22.

The ECU 9 sequentially receives output values from the air-flow sensor 14, the engine cooling water sensor 16, the air-fuel ratio sensor 17 and the catalyst downstream exhaust temperature sensor 19 arranged downstream of the catalyst 18, the pressure sensor 20 for measuring a pressure in the combustion chamber 1 and the crank angle sensor 23.

The compression ratio of the engine is set in a range from about 15 to 20 so that the temperature of the mixture in the combustion chamber 1 can reach a value with which the mixture is self-ignited.

In this embodiment, an engine load is computed from an output value from the accelerator opening degree detecting device 10, and accordingly, the accelerator opening degree detecting device 10 can serve as the engine load detecting means. Although a derivative value obtained from the vehicle speed detecting device (vehicle speed sensor) 12 installed in the vehicle is used for a means for obtaining an acceleration of the vehicle on which the compression ignition internal combustion engine is installed, according to the present invention, an output value from an acceleration sensor installed in the vehicle may be used therefor.

Further, although a turn-on and -off signal is used for determining whether the driver depresses a brake pedal or not, as an output value from the brake depression force detecting device 11, an output value from a brake depression force sensor provided in rear of the brake pedal may be used therefor. Further, a hydraulic pressure sensor provided in a hydraulic pipe line for the brake may be used to detect a brake depression force by the drive.

Further, as shown in FIG. 1, an intake air pressure sensor 24 is provided in the intake port 3, downstream of the intake air volume adjusting device 13. This intake air pressure sensor 24 is adapted to detect a pressure of intake air flowing through the intake port 3, downstream of the intake air volume adjusting device 13.

It is noted that there are further shown, in FIG. 1, a valve changing mechanism 25 for the intake valve, and a valve changing mechanism 26 for the exhaust valve 6.

In this engine, the compression ignition and spark ignition are selectively used in accordance with detection values from the various sensors.

Figure 3:
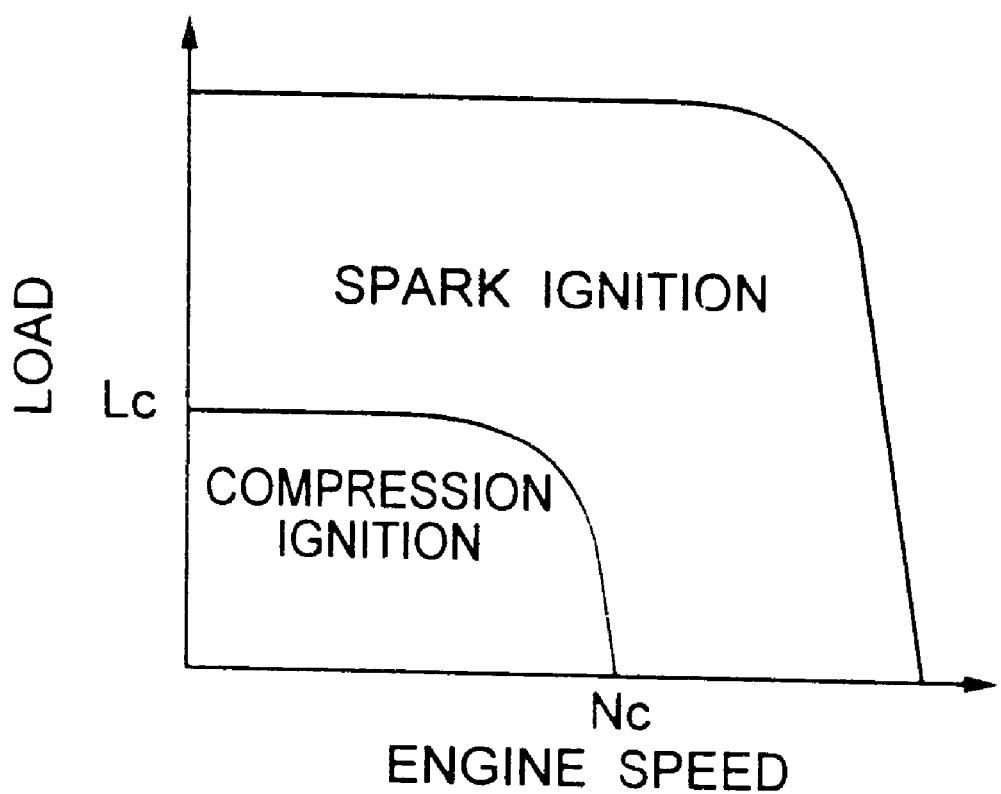
FIG. 3 is a view for an operation mode map with respect to engine speeds and loads of the compression ignition internal combustion engine to which the method of controlling the timing of ignition of the compression ignition engine of a premixed mixture type, according to the present invention, is applied.

FIG. 3 shows an example of an operating range for compression ignition and an operating range for spark ignition with respect to an engine speed and an engine load.

In an example shown in FIG. 3, the operation is made by compression ignition of a premixed mixture if the engine speed is lower than Nc and the load is lower than Lc, but the operation is made by spark ignition at an engine speed and an engine load which are other than those as mentioned above. Accordingly, if the engine speed is lower than Nc but the engine load is higher than Lc, the operation is made by the spark ignition, that is, whenever the engine speed is higher than Nc, the operation is made by the spark ignition even though the engine load is lower than Lc. This is because, in such a case that the engine speed is high (N>Nc), the time of chemical reaction of fuel in the combustion chamber 1 becomes shorter so that self-ignition cannot occur even though the engine load is low (L<Lc), and further, the self-ignition operation causes knocking in such a case that the engine load falls in a high load range (L>Lc) even though the engine speed is low (N<Nc).

Change-over between the compression ignition operation and the spark ignition operation is based upon either a condition in which operation is previously carried out by compression ignition combustion or a condition in which operation is carried out by spark ignition combustion. The conditions with which the above-mentioned change-over is carried out are determined in accordance with an accelerator opening degree which is a value detected by the accelerator opening degree sensor 10, an air-fuel ratio (A/F) which a value detected by the air-fuel ratio sensor 17, a vehicle speed which is a value detected by the vehicle speed detecting device 12, an engine speed N which is a value detected by the crank angle sensor 23, an intake air temperature which is a value detected by the air-flow sensor 14, an engine cooling water temperature which a value detected by an engine cooling water temperature sensor 16, and an exhaust temperature which is a value detected by the catalyst downstream exhaust temperature. These values are written in the ECU in the form of maps.

Figure 4:
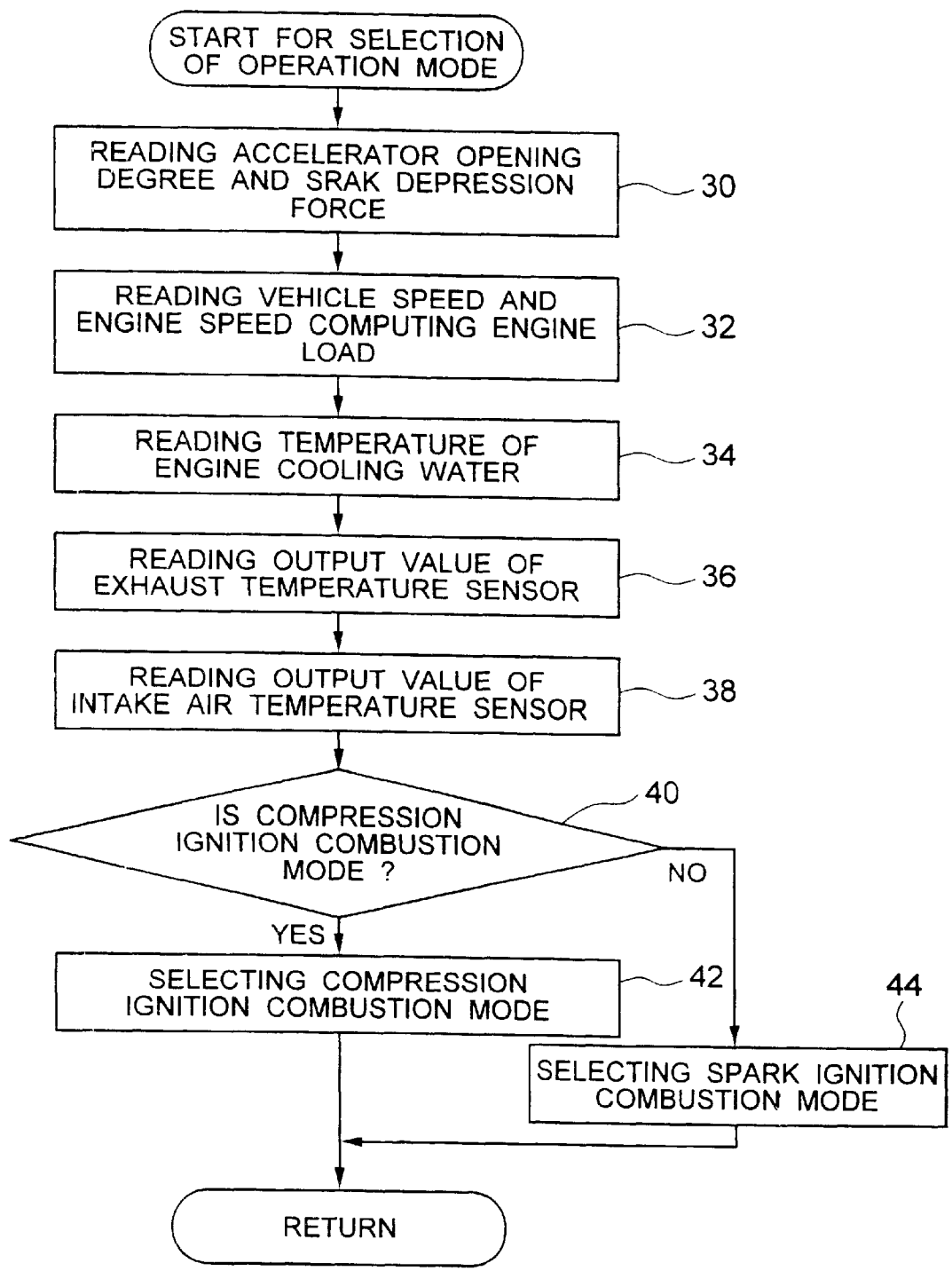
FIG. 4 is a flow chart for selecting an operating mode in the compression ignition internal combustion engine to which the method of controlling the timing of ignition of the compression ignition engine of a premixed mixture type, according to the present invention, is applied.

FIG. 4 shows a control flow-chart for determining whether a combustion method is made by compression ignition or by spark ignition.

Referring to FIG. 4, first, at step 30, the accelerator opening degree which is a value detected by the accelerator opening degree sensor 10 and a brake depression force which is a value detected by the brake depression force detecting device 11 are read. After the accelerator opening degree and the brake depression force are read at step 30, at step 32, the vehicle speed which is a value detected by the vehicle speed detecting device 12 and the engine speed N which is a value detected by the crank angle sensor 23 are read so as to compute an engine load. After the engine load is computed at step 32, at step 34, the engine cooling water temperature which is a value detected by the engine cooling water temperature sensor 16 is read, and at step 36, a value detected by the catalyst downstream exhaust temperature sensor 19 is read. Then, at step 83, an intake air temperature which is a value detected by the air-flow sensor 14 is read. After these detected values are read, at step 40, the read and detected values are comparatively judged so as to determine whether it is the compression ignition combustion mode (the combustion method by compression ignition) or not. If it is determined at step 40 that it is the compression ignition combustion mode, at step 42, the compression ignition combustion mode shown in FIG. 3 is selected. Further, if it is determined at step 40 that it is the spark ignition combustion mode, at step 44, the spark ignition combustion mode (the combustion method by spark ignition) shown in FIG. 3 is selected.

Next, explanation will be made of such a case that the compression ignition combustion mode (the combustion method by compression ignition) is selected (operation by compression ignition combustion is designated) due to the result of determination shown in FIG. 4.

The ECU 9 has received an output value from the accelerator opening degree 10 and an output value from a crank angle sensor 32 serving as a means for detecting the engine speed N, and these value give an output torque of the engine so as to determine a fuel injection volume from the fuel injection value 7 and an intake air volume.

Meanwhile, it has been known that the timing of compression ignition of a mixture gas in the combustion chamber is dependent upon a history of temperature and pressure in the combustion chamber 1 and upon an air-fuel ratio of the mixture gas. Thus, the valve changing mechanism 25 for the intake valve 5, the valve changing mechanism 26 for the exhaust valve 6 and the intake air volume adjusting mechanism 13 are controlled in accordance with the output values from the sensors shown in FIG. 1. The intake air volume adjusting device 13 is the throttle valve in this embodiment. As to this intake air volume adjusting device 13, an electronic control type throttle valve may be preferably used, but a throttle valve which is coupled with the accelerator pedal by means of a wire may be used.

Figure 5:
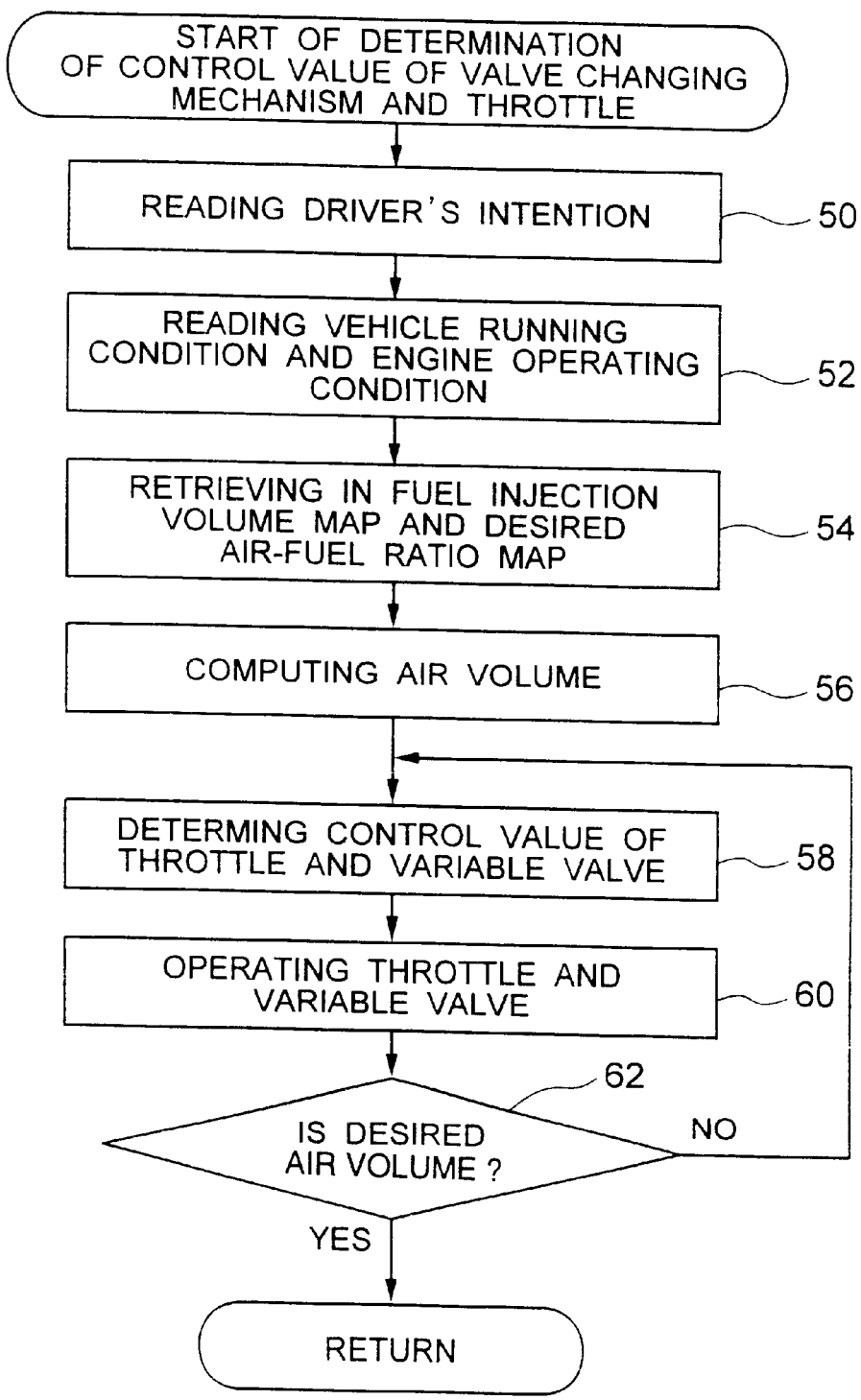
FIG. 5 is a view showing a configuration of fuel spray used in the method of controlling the timing of ignition of the compression ignition engine of premixed mixture type according to the present invention is applied.

FIG. 5 shows a control flow-chart in such a case that the fuel injection volume has been written in the ECU 9 with respect to an engine output torque which is determined in accordance with driver's intention, a vehicle running condition, an engine operating condition and output values from the sensors.

At first, at step 50, the ECU 90 reads an output value from the accelerator opening degree detecting device 10 and an output value from the brake depression force detecting device 11 as the driver's intention. After the output values of the driver's intention are read at step 50, at step 52, a detected value from the accelerator opening degree detecting device 1, a detected value from the air-fuel ratio sensor 17, a detected value from the crank angle sensor 23, a detected value from the air-flow sensor 14, a detected value from the intake air temperature sensor mounted to the air-flow sensor 14, a detected value from the engine cooling water temperature sensor 24 and a detected value from the catalyst downstream exhaust temperature sensor 19 are read into the ECU 9 as a vehicle running condition and an engine operating condition. After the vehicle running condition and the engine operating condition are read at step 52, at step 54, a fuel injection volume and a desired air-fuel ratio are retrieved from a fuel injection volume map and a desired air-fuel ratio map stored in the ECU 9 in accordance with these detected values. After the fuel injection volume and the desired air-fuel ratio are retrieved at step 54, at step 56, a desired air volume is computed from these two values, that is, the fuel injection volume and the desires air-fuel ratio. Thus, the desired air volume can be obtained.

After the desired air volume is obtained at step 56, at step 58, operating degrees of the intake air volume adjusting device (throttle valve) 13, the valve changing mechanism 25 for the intake valve 5 and the valve changing mechanism 26 for the exhaust valve 6 are determined in accordance with the output value from the air-flow sensor 14, the output value from the intake air temperature sensor in the air-flow sensor 14 and the output value from the crank angle sensor 23. After these operating values are determined at step 58, at step 60, the intake air volume adjusting device (throttle valve) 13, the valve changing mechanism 25 for the intake valve 5 and the valve changing mechanism 26 for the exhaust valve 6 are operated. Further, at step 62, whether an actual air volume reaches the desired air volume or not is determined, and if it is determined that the actual air does not yet reach the desired air volume at step 62, the process at the step 58 is again carried out. If it is determined that the actual air volume reaches the desired air volume at step 62, the process at step 50 is again carried out.

Explanation will be made of a configuration of fuel spray used in this embodiment with reference to FIG. 6.

The fuel injection valve 7 is fed thereto with fuel having a pressure of about 3 to 12 MPA by a fuel pump 101, and the tip end valve of the fuel injection valve 7 is opened by a period determined by a valve opening signal from the ECU 9. Accordingly, a predetermined volume of the fuel is fed into the combustion chamber 1 from the fuel injection valve 7. In this configuration, the structure of the fuel injection valve 7 and the fuel pressure have been set so that an averaged particle size of injected fuel spray 100 becomes less than about 30 $\mu$m in order to sufficiently evaporate the fuel. The pressure of the fuel pump 101 is set by a fuel pressure setting signal 202 from the ECU 9. The fuel spray 100 sprayed from the nozzle tip of the fuel injection valve 7 has a conical shape having an apex at the nozzle tip end of the fuel injection valve 7 as shown in FIG. 6. At this time, it is desirable that the flow rate distribution (flow rate per unit area) over the cross-section of the spray is uniform as exhibited by A in FIG. 7. This is because the contact area between air and fuel is increased so as to enhance the evaporation of fuel, and a uniform and thin liquid film which is uniform and thine as possible as it can, is formed on the piston as possible as it can when the spray impinges upon the piston. Further, as indicated by B in FIG. 7, in the case of the spray having a large flow rate distribution, the evaporation is unsatisfactory in a part where the flow rate is high, and when the spray impinges upon the piston, it is likely to locally form a thick liquid film on the piston, resulting in increase in soot and unburnt HC.

Figure 6:
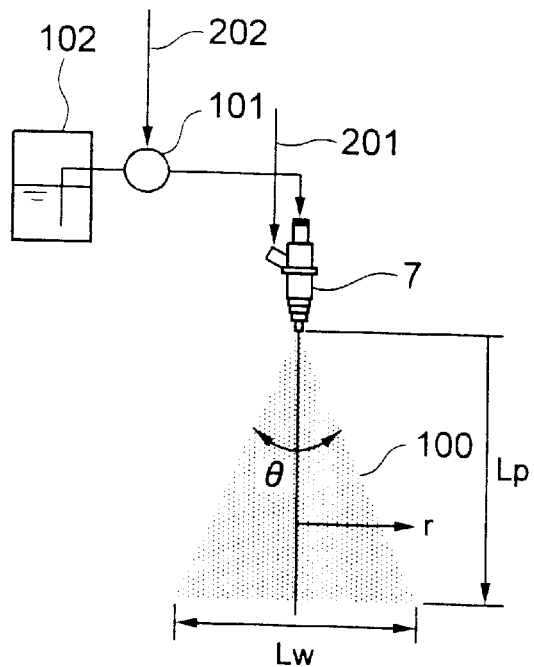
FIG. 6 is a flow chart for controlling an intake air volume adjusting device and a valve changing mechanism in a compression ignition combustion range within the compression ignition internal combustion engine to which the method of controlling the timing of ignition of the compression ignition engine of a premixed mixture type according to the present invention is applied.
Figure 8:
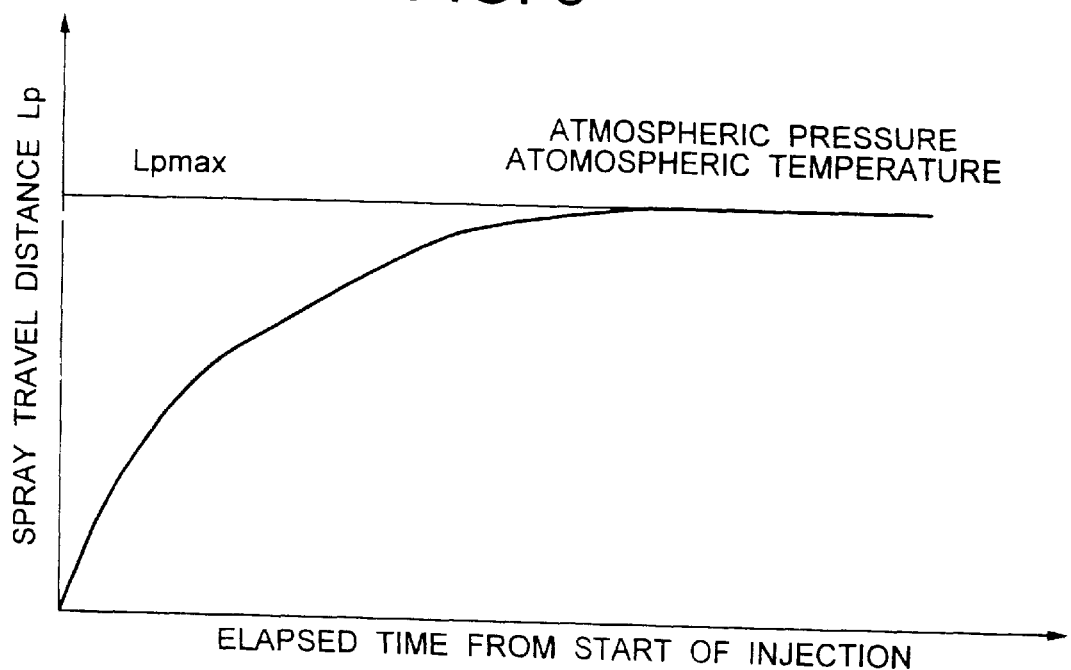
FIG. 8 is a view showing change in the time of penetration of fuel spray used in the compression ignition internal combustion engine to which the method of controlling the timing of ignition of the compression ignition engine of a premixed mixture type according to the present invention is applied.

Further, as to the travel distance (penetration) Lp of the fuel spray 100 upon injection of fuel from the fuel injection valve 7, as shown in FIG. 6, it is desirable that a maximum penetration Lpmax which is obtained by injecting fuel having a volume corresponding to a maximum engine load during self-ignition operation, into static air at an atmospheric pressure under a normal temperature condition as shown in FIG. 8 falls in a range of about 70 to 90% of the stroke length of the piston in order to effect such a condition that the spray does not substantially impinge upon the piston when the fuel is injected in the vicinity of the bottom dead center, so as to evaporate the fuel in the combustion chamber while at least a part of the fuel can impinge upon the piston when the fuel is injected in the first half of intake stroke. The spray penetration is set by ECU 9 so that the fuel pressure obtained by the fuel pump is changed so as to obtain the above-mentioned condition during compression ignition operation. Alternatively, the fuel injection valve 7 may have such a configuration that the fuel pressure during self-ignition operation is set to be constant, and as to the penetration at the fuel pressure, the maximum penetration Lpmax falls in the range of about 70 to 90% of the stroke length of the piston.

Figure 7:
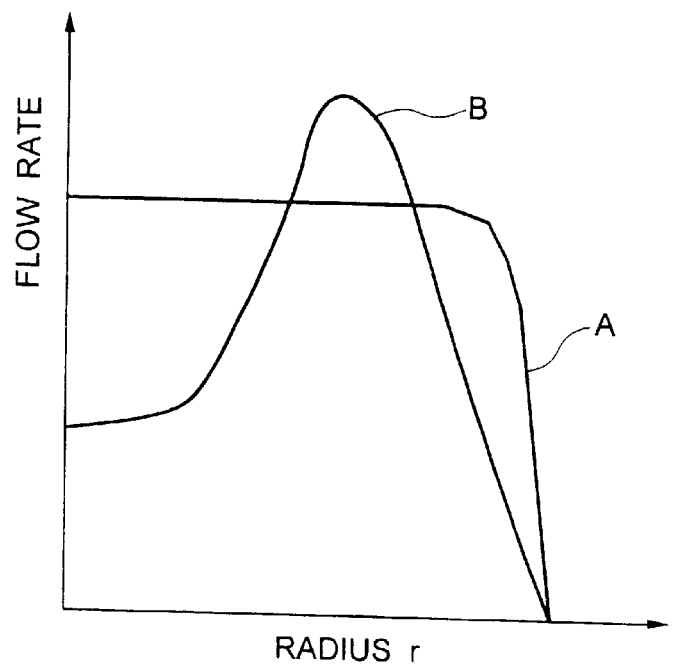
FIG. 7 is a view illustrating a flow rate distribution over the cross-section of fuel spray used in the compression ignition internal combustion engine to which the method of controlling the timing of ignition of the compression ignition engine of a premixed mixture type according to the present invention is applied.

Meanwhile, it is desirable to set the spray angle $\theta$ of the fuel spray 100 which is obtained when the fuel is injected from the fuel injection valve 7 as shown in FIG. 7, to a value with which the spray width Lw of the fuel spray 100 falls in a range of 90 to 100% of the bore diameter of the combustion chamber 1 when the spray penetration falls in the range of 70 to 90% of the stroke length of the piston.

If the fuel is injected into the combustion chamber 1 from the fuel injection valve 7 with a spray angle $\theta$ with which the spray width Lw of the fuel spray 100 is wider than the above-mentioned value, when the fuel is injected in the vicinity of the bottom dead center, a part of the fuel spray 100 sticks to the bore wall of the combustion chamber 1, resulting in dilution of oil and increase of unburnt HC. If the fuel is injected into the combustion chamber 1 from the fuel injection valve 7 with a spray angl with which the spray width Lw of the fuel spray 100 is narrower than the above-mentioned value, the degree of concentration of the fuel spray injected from the fuel injection valve 7 increases, and accordingly, the evaporation of fuel is deteriorated.

FIGS. 9 to 13 show process steps in a method in which a fuel spray and a mixture gas are produced during self-ignition operation in a compression ignition internal combustion engine to which the method of controlling the timing of ignition of the compression ignition engine of a premixed mixture type according to the present invention is applied. FIG. 9, FIG. 10, FIG. 11, FIG. 12 and FIG. 13 show intake stroke, compression stroke, self-ignition stroke, expansion stroke, and exhaust stroke, respectively.

Figure 9:
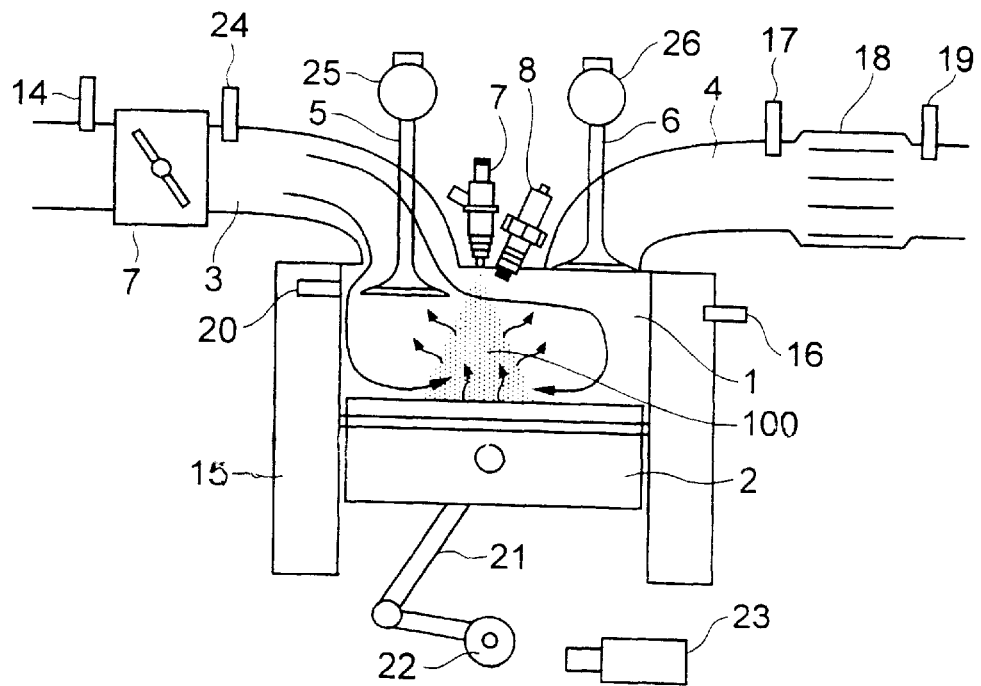
FIG. 9 is a view showing intake stroke during compression ignition operation in the compression ignition internal combustion engine to which the method of controlling the timing of ignition of the compression ignition engine of a premixed mixture type according to the present invention is applied.

During self-ignition operation, in intake stroke, the intake valve 5 is opened, as shown in FIG. 9, and accordingly, air having a flow rate which is set to a predetermined value by the intake air volume adjusting device (throttle valve) 13 is led into the combustion chamber 1 through the intake port 3. Further, fuel having a predetermined volume determined by the ECU 9 is injected into the combustion chamber 1 from the fuel injection valve 7 with a timing which is determined by the ECU 9. This FIG. 9 shows an example in which fuel is injected in the middle of intake stroke, and accordingly, the fuel spray 100 which has been atomized so as to have an averaged particle size of less than 30 $\mu$m, is evaporated through heat-exchange with air in the combustion chamber 1. Further, a part of fuel injected into the fuel injection valve 7 impinges upon the crown surface of the piston 2, and accordingly, it receives a heat from the piston so as to be evaporated.

Figure 10:
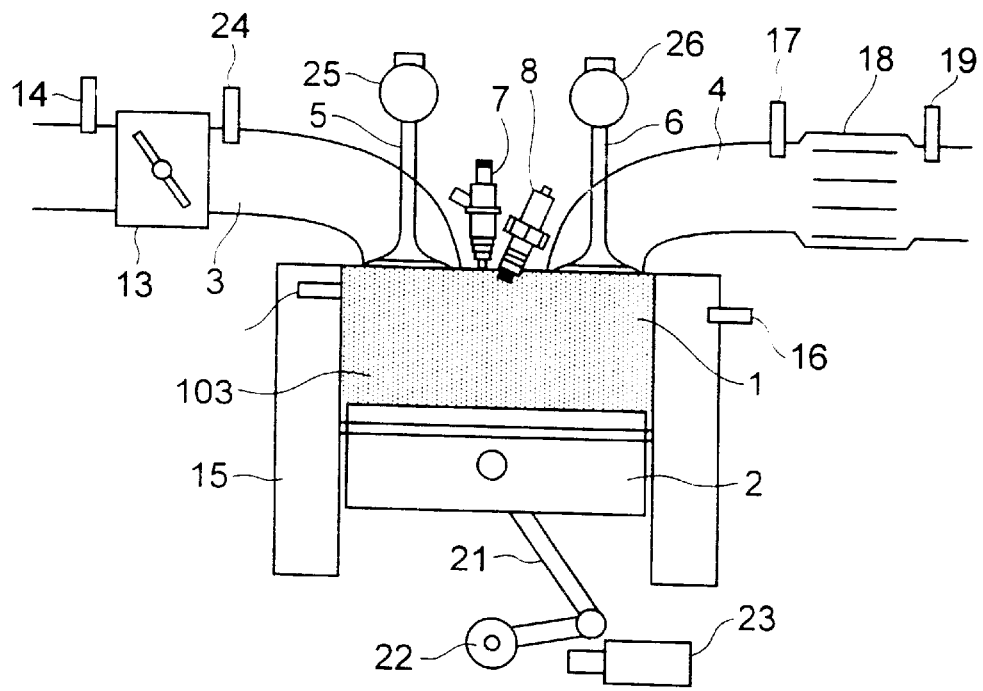
FIG. 10 is a view showing compression stroke during compression ignition operation in the compression ignition internal combustion engine to which the method of controlling the timing of ignition of the compression ignition engine of a premixed mixture type according to the present invention is applied.
Figure 11:
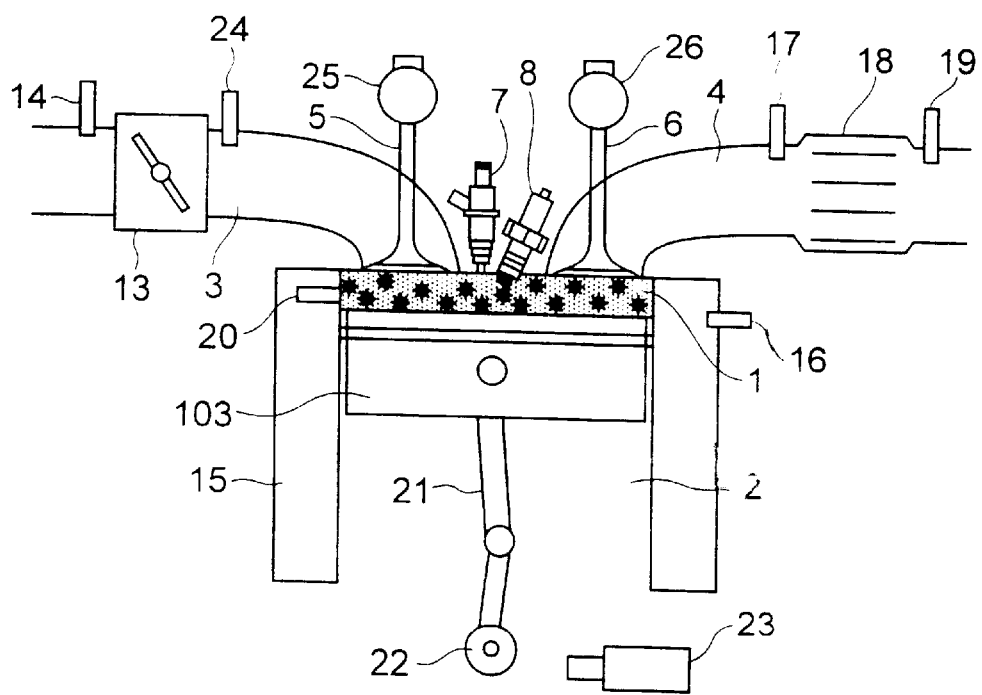
FIG. 11 is a view showing ignition stroke during compression ignition operation in the compression ignition internal combustion engine to which the method of controlling the timing of ignition of the compression ignition engine of a premixed mixture type according to the present invention is applied.

The evaporated fuel is mixed with the air in the combustion chamber 1 through air motion caused during intake stroke as shown in FIG. 9 so as to create a mixture gas 103 as shown in FIG. 10. During compression stroke shown in FIG. 10, the intake valve 5 is closed, and the piston 2 ascends. When the piston 2 ascends, the pressure and the temperature in the combustion chamber 1 rise up so as to progress low temperature oxidation reaction. Further, when the piston 2 ascends further up to a position in the vicinity of the top dead center, the mixture gas 103 in the combustion chamber 1 comes into self-ignition by way of blue flame reaction, as shown in FIG. 11. Thus, after the mixture gas 103 in the combustion chamber 1 causes the blue flame reaction so as to be self-ignited, the temperature and the pressure in the combustion chamber 1 abruptly rise up, and accordingly, the combustion chamber 1 abruptly expands.

Figure 12:
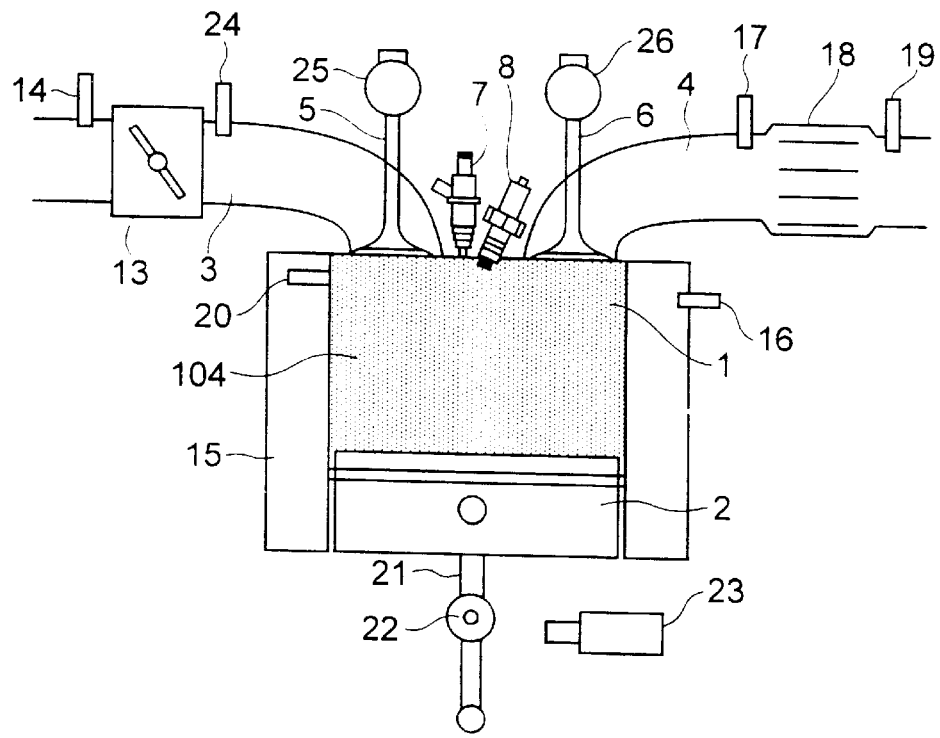
FIG. 12 is a view showing expansion stroke during compression ignition operation in the compression ignition internal combustion engine to which the method of controlling the timing of ignition of the compression ignition engine of a premixed mixture type according to the present invention is applied.
Figure 13:
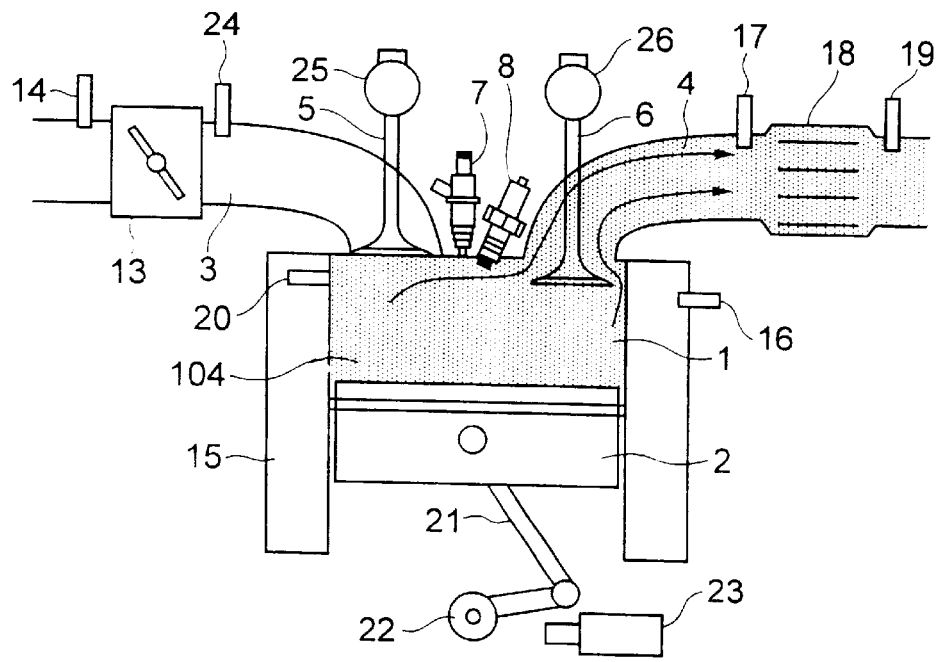
FIG. 13 is a view showing exhaust stroke during compression ignition operation in the compression ignition internal combustion engine to which the method of controlling the timing of ignition of the compression ignition engine of a premixed mixture type according to the present invention is applied.

In this expansion stroke in which the temperature and the pressure in the combustion chamber 1 rise up abruptly, as shown in FIG. 12, the piston 2 is depressed downward so as to obtain a power for rotating the drank shaft 21. In this expansion stroke as shown in FIG. 12, the piston 2 is moved down to the bottom dead center, and thereafter, it is pressed upward. In exhaust stroke in which the piston 2 is moved upward as shown in FIG. 13, the exhaust valve 6 is opened so that combustion gas flows through the exhaust port 4, is then fed into the catalyst 18. In the catalyst 18, hazardous constituents such as NOx, HC and CO in the exhaust gas are purified. The exhaust gas having hazardous constituents purified by the catalyst 18 is emitted into the atmosphere through a muffler (which is not shown).

Figure 30:
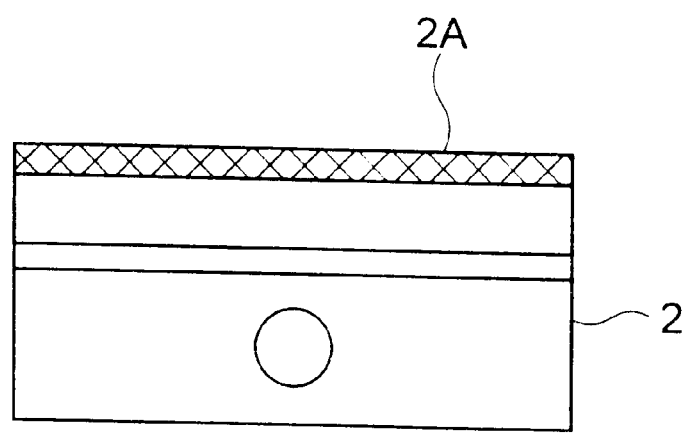
FIG. 30 is a view illustrating a configuration of a piston in a compression ignition internal combustion engine to which the method of controlling the timing of ignition of the compression ignition engine of a premixed mixture type according to the present invention is applied.

It is preferable to form the crown surface 2A of the piston 2 from a material having a heat capacity which is greater than that of the piston 2 body, such as ceramic as shown in FIG. 30 since the temperature of the crown surface of the piston 2 rises up further, the fuel sticking to the piston 2 is smoothly evaporated.

Next, explanation will be made of an embodiment of a method of controlling the timing of ignition of the combustion ignition engine of a premixed mixture type according to the present invention. In this embodiment, the timing of fuel injection is controlled in accordance with an engine speed in order to make the timing of self-ignition during compression ignition operation appropriate.

At first, the reason why the control of the timing of ignition is required during self-ignition operation will be explained.

Figure 14:
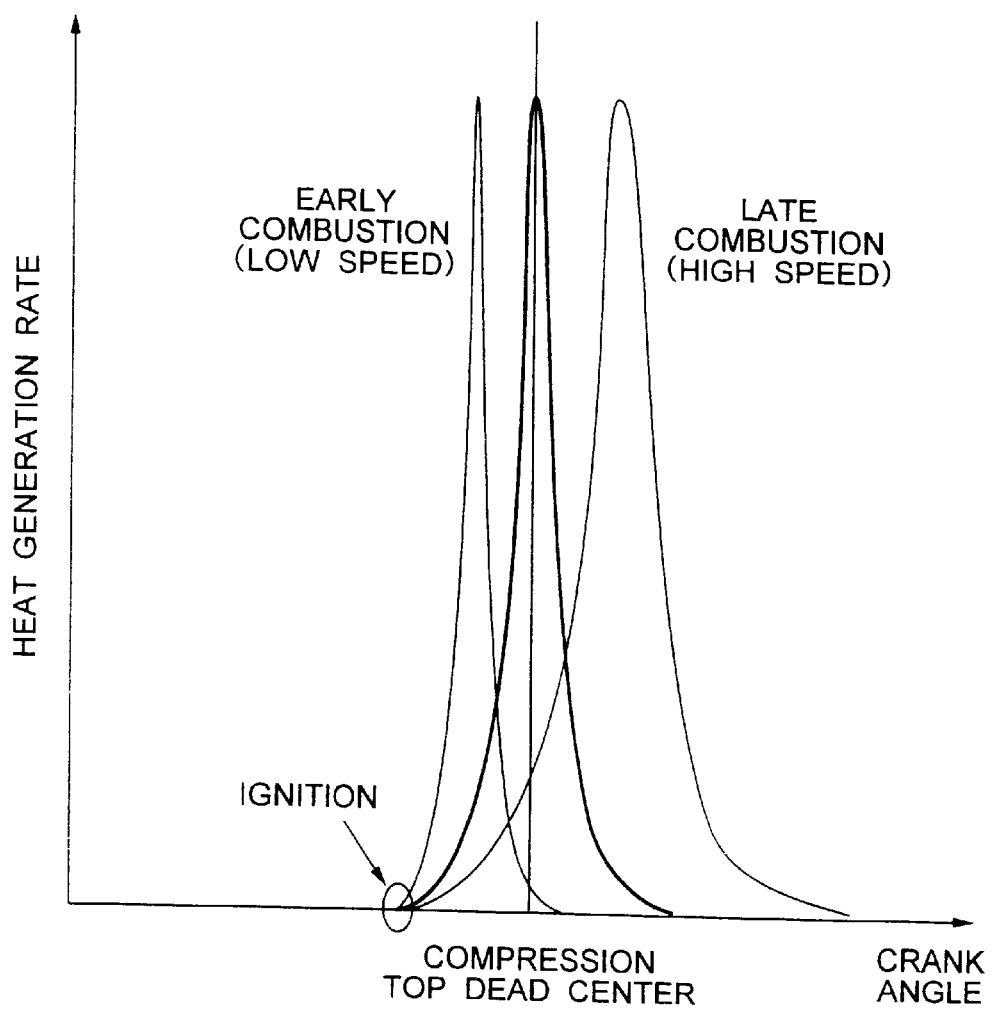
FIG. 14 is a view showing variation in heat generation rate in dependence upon a crank angle upon compression ignition of the compression ignition internal combustion engine to which the method of controlling the timing of ignition of the compression ignition engine of a premixed mixture type according to the present invention is applied.

FIG. 14 shows the heat generation rate v.s. the crank angle upon ignition during self-ignition operation.

FIG. 14 shows how the heat generation rate changes in dependence upon a crank angle when the engine speed is change while the timing of ignition during self-ignition operation is set to be constant. The self-ignition during compression ignition operation exhibits such a characteristic that the period of heat generation does not vary substantially as views in an absolute time, irrespective of an engine speed. As shown in FIG. 14, when the engine speeds is optimum, the heat generation becomes maximum in the vicinity of the top dead center of compression. However, if the timing of ignition during self-ignition operation is constant, the crank angle at which the heat generation becomes maximum is advanced (a position shifted leftward from the top dead center of compression shown in FIG. 14) when the engine speed is low, but the crank angle at which the heat generation becomes maximum is retarded (a position shifted rightward from the top dead center of compression shown in FIG. 14) when the engine speed is high. That is, since the self-ignition during the compression ignition operation does not substantially change its heat generation period as viewed in the absolute time, irrespective of an engine speed, the ascending speed of the piston after self-ignition by way of blue flame reaction is lower than the speed of the self-ignition combustion when the engine speed is low, and accordingly, a peak with this the heat generation becomes maximum occurs before the piston comes to the top dead center of compression so that the heat generation becomes maximum at a time before the a position in the vicinity of the top dead center of compression. Meanwhile, the ascending speed of the piston 2 after the self-ignition by way of blue flame reaction is higher than the speed of self-ignition combustion when the engine speed is high, the peak with which the heat generation becomes maximum does not yet occurs even though the piston 2 comes to a position in the vicinity of the top dead center of compression, that is, the peak with which the heat generation becomes maximum occurs at a time after the piston 2 passes over the top dead center of compression. Thus, the heat generation becomes maximum after the piston 2 passes over the top dead center of compression.

Accordingly, since the heat efficiency becomes satisfactory in such a case that the heat generation becomes maximum when the piston 2 comes to a position in the vicinity of the top dead center of compression, the heat efficiency become most satisfactory by such control that the peak with which the heat generation is maximum when the piston 2 comes to the top dead center of compression even thought the engine speed is low or high. According, it is required that the timing of ignition is appropriately controlled in dependence upon an engine speed. Specifically, the timing of ignition is retarded during low engine speed operation but is advanced during high engine speed operation so as to optimize the timing of heat generation.

Figure 15:
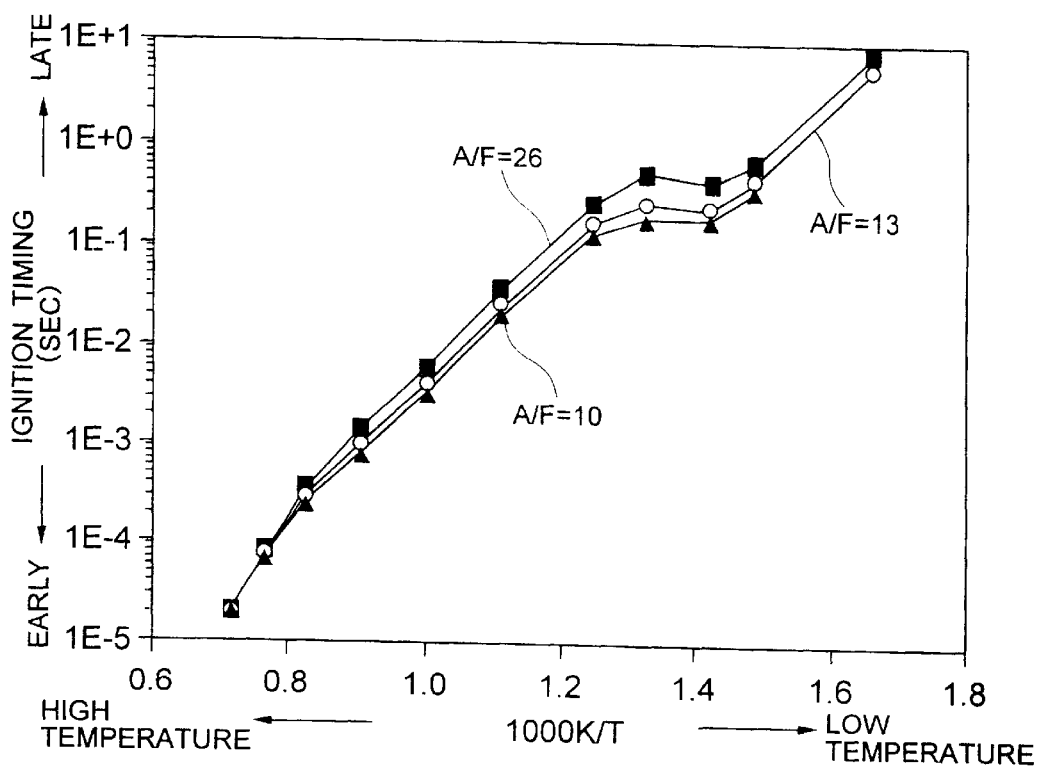
FIG. 15 is a view showing the relationship between the temperature of mixture gas and the time of ignition lag upon self-ignition of the compression ignition internal combustion engine to which the method of controlling the timing of ignition of the compression ignition engine of a premixed mixture type according to the present invention is applied.

Meanwhile, it has been known that the very strong correlation is present between the timing of ignition during self-ignition operation and the temperature of a mixture gas. FIG. 15 shows this relationship between the temperature of the mixture gas and the time lag in ignition.

Referring to FIG. 15, the timing of ignition is taken on the ordinate, and the inverse of the temperature of the mixture gas is taken on the abscissa. Since the inverse of the temperature of the mixture gas is taken on the abscissa, the temperature of the mixture gas becomes higher leftward on the abscissa. Further, the lag time of ignition taken on the ordinate in FIG. 15 is exhibited by a logarithmic scale. As clearly understood from the characteristic shown in FIG. 15, as the temperature of the mixture gas becomes higher, the lag time of the ignition becomes shorter abruptly. That is, it can be understood that during compression ignition operation, the timing of ignition can be largely changed by slightly changing the temperature of the mixture gas.

Accordingly, in this embodiment, with the use of latent heat of evaporation of the fuel spray 100, the temperature of the mixture gas is controlled so as to obtain an optimum timing of ignition.

Figure 16:
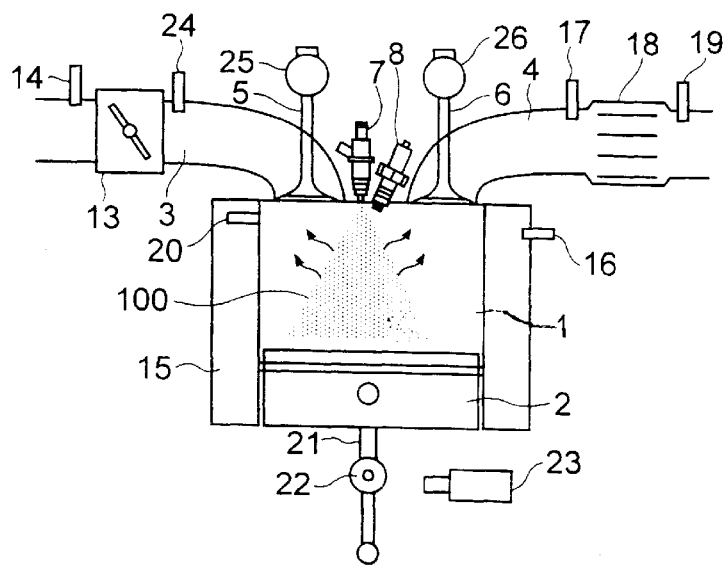
FIG. 16 is a view showing the behavior of fuel spray during low speed operation of the compression ignition internal combustion engine to which the method of controlling the timing of ignition of the compression ignition engine of a premixed mixture type according to the present invention is applied.

In order to carry out the compression ignition operation at a low engine speed, as shown in FIG. 16, fuel is injected from the fuel injection valve 7 in the vicinity of the bottom dead center of intake within the combustion chamber 1. Since the fuel pressure and the configuration of the fuel injection valve 7 are determined so that the fuel spray 100 injected from the fuel injection valve 7 has a penetration which is about 70 to 90% of the stroke length of the piston, the fuel spray 100 can be evaporated by a substantial part thereof in the atmosphere of the combustion chamber 1 without impinging upon the piston 2. When the fuel is injected from the fuel injection valve 7 into the combustion chamber, it absorbs the latent heat of evaporation from the air in the combustion chamber 1, and accordingly, the temperature of the mixture gas created in the combustion chamber 1 becomes lower. Thus, the lag time of ignition becomes longer, and accordingly, the timing of ignition is retarded.

Figure 17:
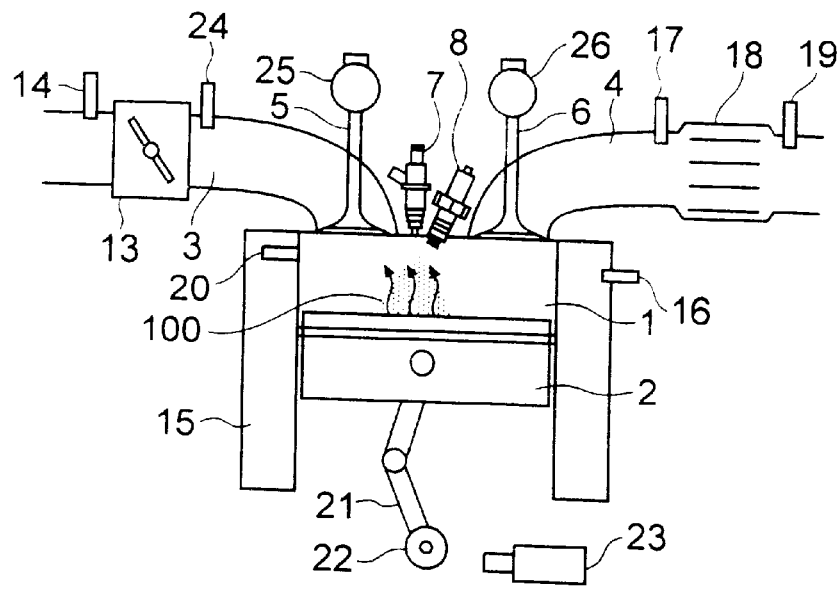
FIG. 17 is a view showing the behavior of fuel spray during high speed operation of the compression ignition internal combustion engine to which the method of controlling the timing of ignition of the compression ignition engine of a premixed mixture type according to the present invention is applied.

Meanwhile, when the compression ignition operation is carried out at a high engine speed, as shown in FIG. 17, the fuel is injected into the combustion chamber 1 from the fuel injection valve 7 in the first half of intake stroke. The distance between the tip nozzle of the fuel injection valve 7 and the piston 1 is shorten than that of the penetration of the fuel spray 100 injected from the fuel injection valve 7, and accordingly, the fuel spray 100 impinges upon the crown surface 2A of the piston 2 by a large amount thereof so as to form a liquid film on the piston 2. The fuel flow rate distribution over the cross-section of the fuel spray 100 from the fuel injection valve 7 is uniform, the liquid created at that time has a uniform thickness. Since the liquid film on the piston 1 which is formed when the fuel impinges upon the crown surface 2A of the piston 2, is evaporated by a heat transmitted from the piston 2, the latent heat of evaporation absorbed by the fuel spray 100 from the air in the combustion chamber 1 is less, and accordingly, the temperature of the mixture gas created in the combustion chamber 1 is higher than that at a low engine speed. Accordingly, the lag time of ignition becomes short, and as a result, the timing of ignition can be advanced in comparison with that at the low engine speed.

Figure 18:
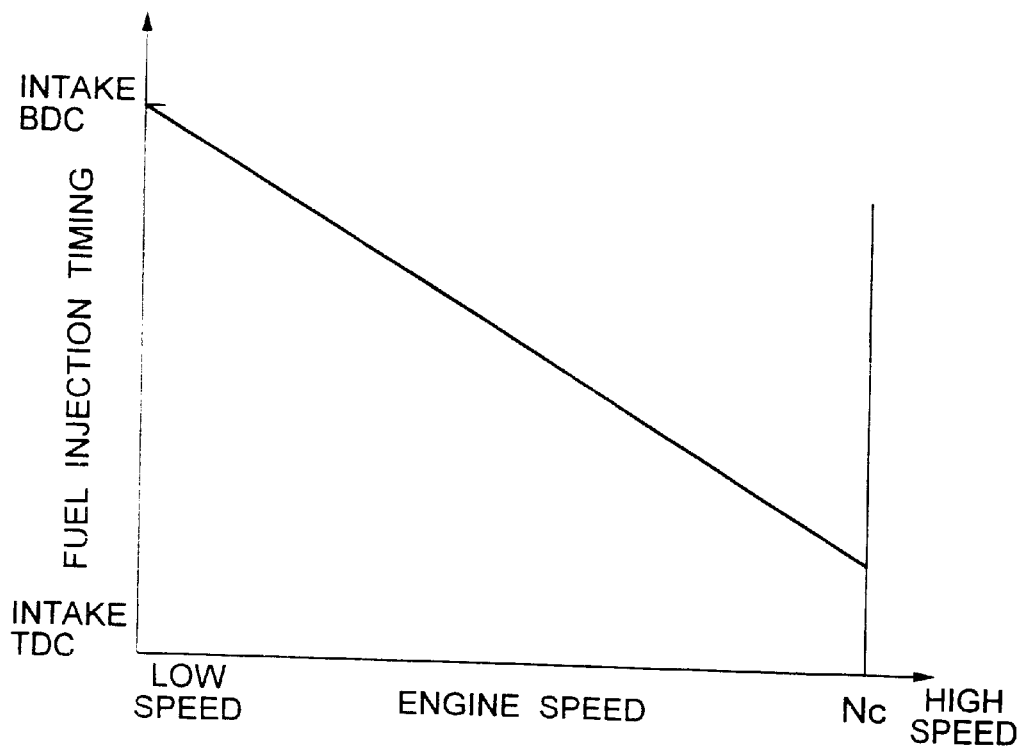
FIG. 18 is a view showing the timing of fuel injection with respect to engine speed in the compression ignition internal combustion engine to which the method of controlling the timing of ignition of the compression ignition engine of a premixed mixture type according to the present invention is applied.
Figure 19:
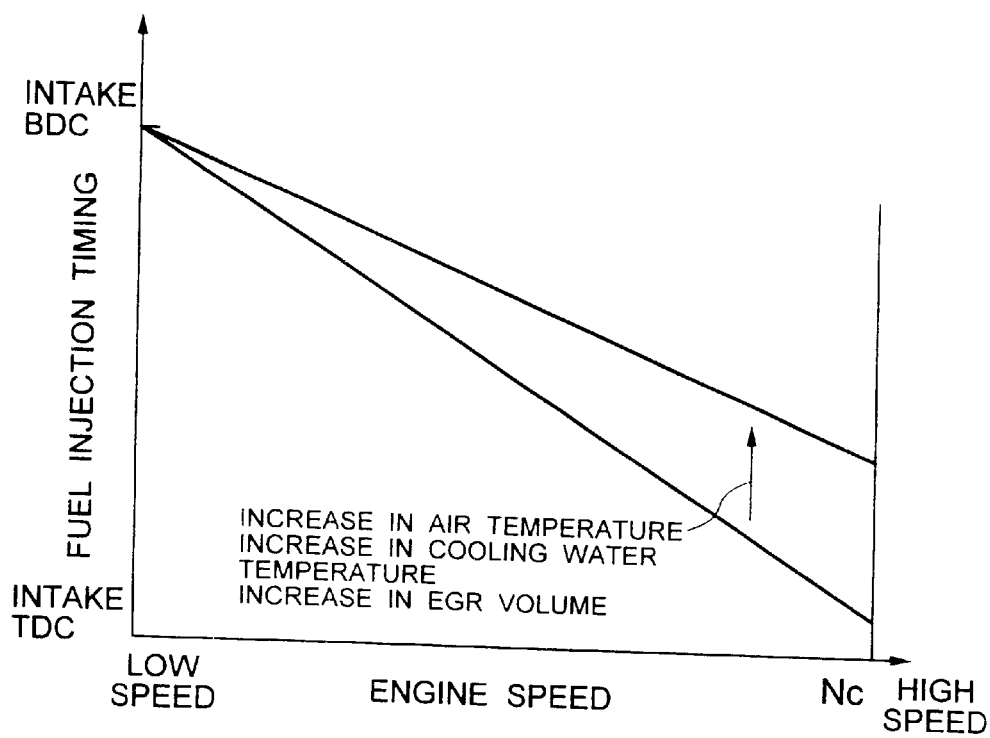
FIG. 19 is a view showing the compensation for disturbance of the timing of fuel injection with respect to engine speed in the compression ignition internal combustion engine to which the method of controlling the timing of ignition of the compression ignition engine of a premixed mixture type according to the present invention is applied.

FIG. 18 shows a relationship between the engine speed and the timing of fuel injection during compression ignition operation in this embodiment. Such a relationship between the engine speed and the timing of fuel injection has been stored in the ECU 9, and accordingly, the timing of fuel injection can be determined in accordance with an engine speed N detected by the crank angle sensor 23.

If the engine speed N is lowest, the fuel is injected at the bottom dead center of intake, and the timing of injection is advanced continuously toward the top dead center of intake as the engine speed increase. Since the volume of fuel spray impinging upon the piston 2 increases as the timing of fuel injection is advanced, the rate of evaporation by the heat from the piston is increased while the cooling volume by the latent heat of evaporation is relatively decreased, and accordingly, the temperature of the mixture gas becomes higher. Thus, the timing of ignition is advanced, and accordingly, combustion with a high degree of heat efficiency can be carried out even at a high engine speed.

It is noted that the temperature of air sucked into the engine is changed in dependence upon an ambient temperature, a temperature of engine cooling water, a volume of exhaust gas recirculation (EGR volume), and accordingly, in the combination of control for correcting these affections, the control of timing of ignition with a high degree of accuracy can be made. The ambient temperature is detected by the air flow sensor 14 shown in FIG. 1, and the temperature of cooling water is detected by the engine cooling water temperature sensor 16.

Further, the EGR volume has been stored in the ECU 9 in the form of a map with respect to the valve operating timing of the valve changing mechanism 25 for the inlet valve 5 and the valve changing mechanism 26 of the exhaust valve 6. Further, although it is not shown in this embodiment, in the case of using an external EGR, the EGR volume has been previously written in The ECU 9 in the form of a map with respect to the opening degree of a valve for controlling the EGR volume, the engine speed and the engine load, and accordingly, the EGR volume can be known by referring to the map. With the use of these detected values, the fuel injection timing with respect to the engine speed N can be corrected. That is, as the temperature of air rises up, the temperature of cooling water rises up or the EGR volume increases, since the temperature of mixture gas rises up so that the timing of ignition is advanced, the injection timing map is corrected so as to retard the timing of fuel injection on the high engine speed side in order to retard the timing of ignition.

Figure 20:
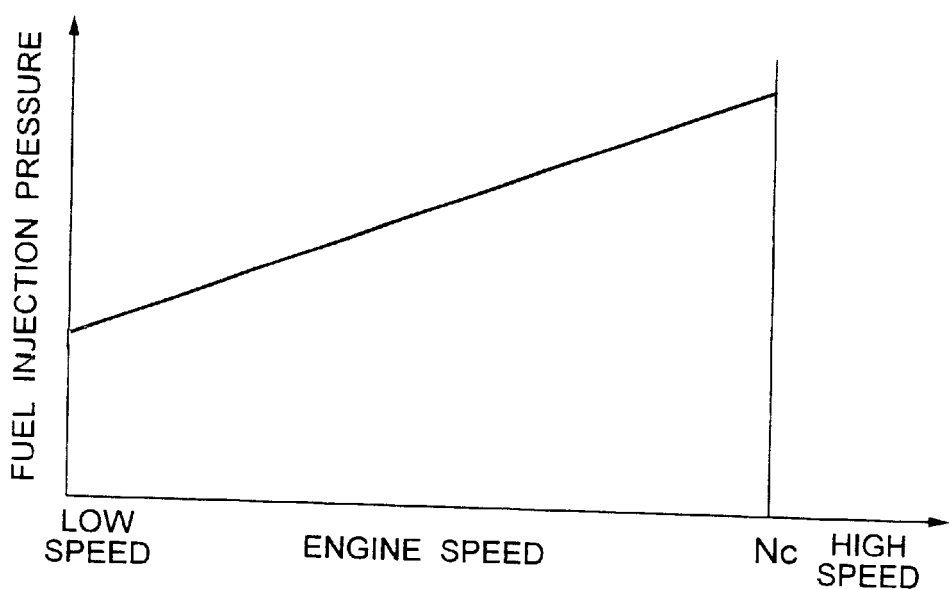
FIG. 20 is a view showing the characteristics of control of the timing of ignition by fuel pressure in an embodiment of the method of controlling the timing of ignition of the compression ignition engine of a premixed mixture type according to the present invention.

Further, as to the method of controlling the timing of ignition, as shown in FIG. 20, there is a method of changing the pressure of fuel injection while the timing of fuel injection is set to be constant.

Figure 21:
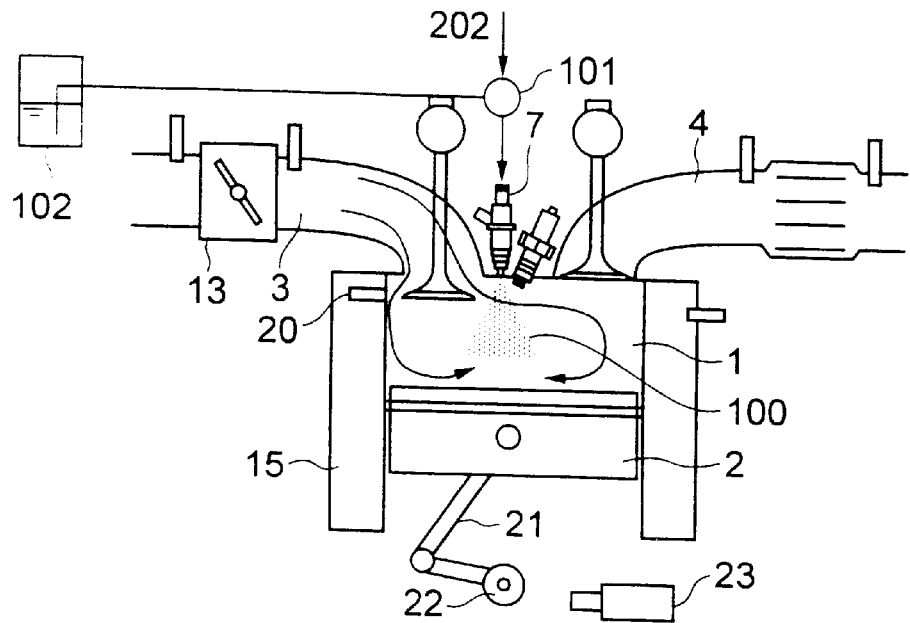
FIG. 21 is a view showing the behavior of fuel spray during low speed operation under control of the timing of ignition by fuel pressure in an embodiment of the method of controlling the timing of ignition of the compression ignition engine of a premixed mixture type according to the present invention.

If the engine speed is low, as shown in FIG. 21, the fuel pressure is set to be low by a fuel setting signal 202 delivered to the fuel pump 101 from the ECU 9, and accordingly, the penetration of the fuel spray 100 injected into the combustion chamber 1 from the fuel injection valve 7 becomes shorter. Accordingly, the volume of fuel impinging upon the piston 2 is decreased so that the temperature of the mixture gas in the combustion chamber 1 is lowered by the latent heat of evaporation of the fuel. As a result, the timing of ignition is retarded.

Figure 22:
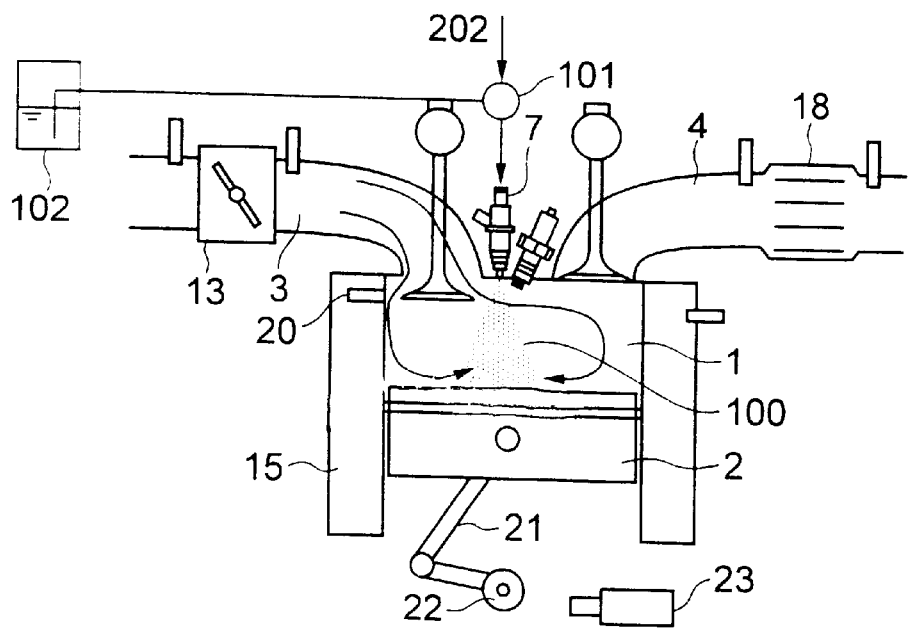
FIG. 22 is a view showing the behavior of fuel spray during high speed operation under control of the timing of ignition by fuel pressure in an embodiment of the method of controlling the timing of ignition of the compression ignition engine of a premixed mixture type according to the present invention.

Meanwhile, if the engine speed is high, as shown in FIG. 22, the fuel pressure is set to be high by the fuel pressure setting signal 202 delivered to the fuel pump 101 from the ECU 9, and accordingly, the penetration of the fuel spray 100 injected into the combustion chamber 1 from the fuel injection valve 7 becomes longer. Accordingly, the fuel volume impinging upon the piston 2 is increased, the temperature of mixture gas in the combustion chamber 1 is restrained from lowering. Thus, the timing of ignition is advanced.

Further, as to the method of controlling the timing of fuel injection, there is a method of changing the frequency of fuel injection per cycle while the timing of fuel injection is set to be constant.

Figure 23:
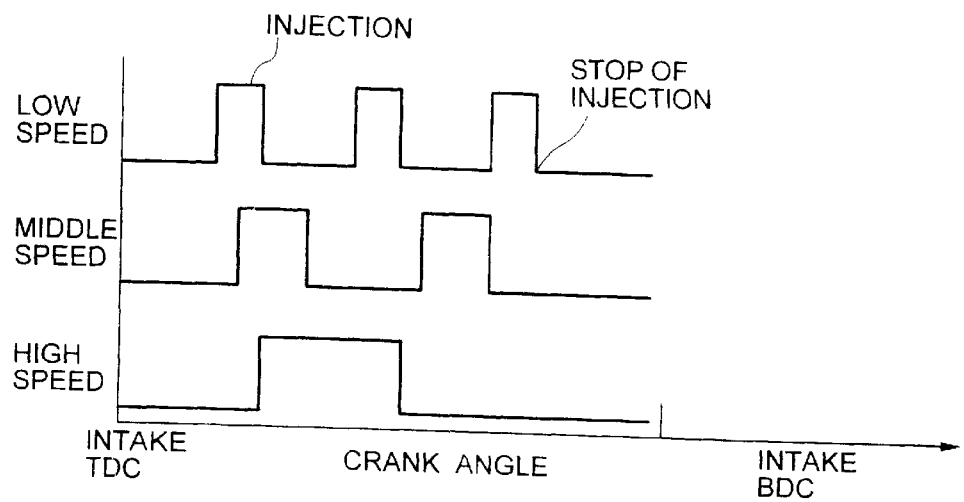
FIG. 23 is a view showing a condition in which the timing of ignition is controlled in dependence upon a frequency of fuel injection in an embodiment of the method of controlling the timing of ignition of the compression ignition engine of a premixed mixture type according to the present invention.
Figure 24:
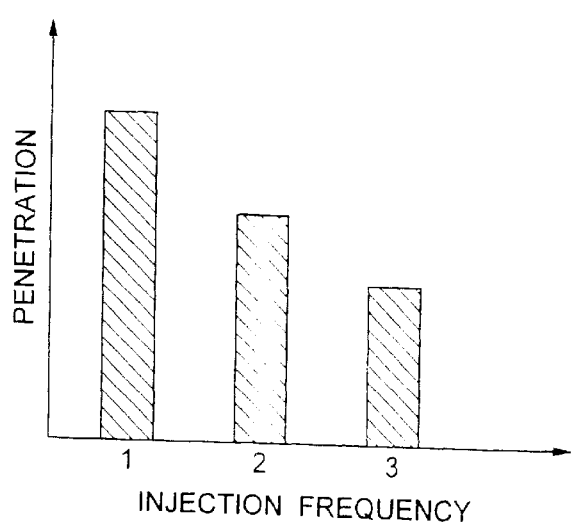
FIG. 24 is a view showing variation in penetration of fuel spray in dependence upon a frequency of fuel injection shown in FIG. 23.

As shown in FIG. 23, the frequency of fuel injection for directly injecting the fuel into the combustion chamber 1 during intake stroke is increased as the engine speed becomes lower while the fuel pressure is set to be constant. In this case, if the load demanded by the engine is constant, the fuel injection volume becomes constant, and accordingly, the period of injection per injection becomes shorter as the frequency of injection increases. If the injection volume and the fuel pressure are constant, the penetration of the fuel spray becomes shorter as the frequency of injection is increased, as shown in FIG. 24. This is because the total injection period (the period from the start of a first injection to the end of a final injection) is long as the frequency of injection is increased, and accordingly, the averaged speed of the spray is lowered.

Thus, the penetration of the spray is shortened by increasing the frequency of injection on the low engine speed side so as to decrease the volume of the spray impinging upon the piston. As a result, the lowering of the temperature of the mixture gas due to the latent heat of evaporation becomes larger, and accordingly, the timing of ignition can be retarded. On the contrary, on the high engine speed side, the frequency of injection is decreased so that the penetration of the spray becomes longer, and accordingly, the volume of fuel impinging upon the piston is increased. As a result, the lowering of the temperature of the mixture gas due to the latent heat of evaporation become smaller, and accordingly, the timing of ignition can be advanced.

Further, even in a port injection type engine, the timing of ignition can be controlled with the timing of fuel injection.

Figure 25:
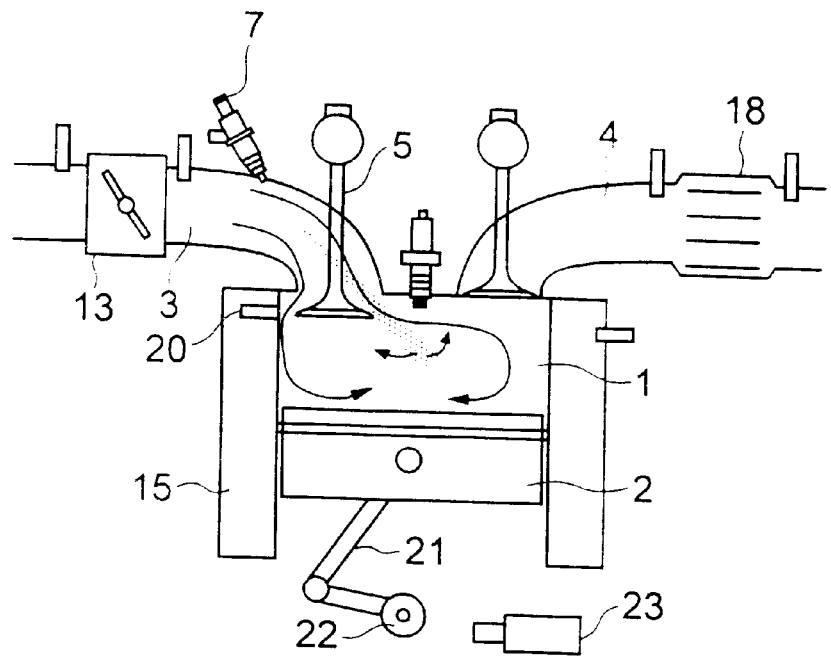
FIG. 25 is a view showing the behavior of fuel spray during low speed operation under control of the timing of ignition in dependence upon the timing of fuel injection in a compression ignition internal combustion engine of a port injection type to which the method of controlling the timing of ignition of the compression ignition engine of a premixed mixture type according to the present invention is applied.

In this case, during low engine speed operation of the compression ignition, as shown in FIG. 25, fuel is injected from the fuel injection valve 7 mounted in the intake port 3 during intake stroke. The fuel is evaporated in the combustion chamber 1 without sticking to the wall surface of the intake port 3. Although a part of the fuel injected during intake stroke impinges upon the intake valve, the substantial part thereof is respattered, without impinging upon the intake valve 5, and is introduced into the combustion chamber, being carried by the intake air flow so as to be evaporated within the combustion chamber. Accordingly, the mixture gas in the combustion chamber is cooled by the latent heat of evaporation. Thus, the timing of ignition is retarded.

Figure 26:
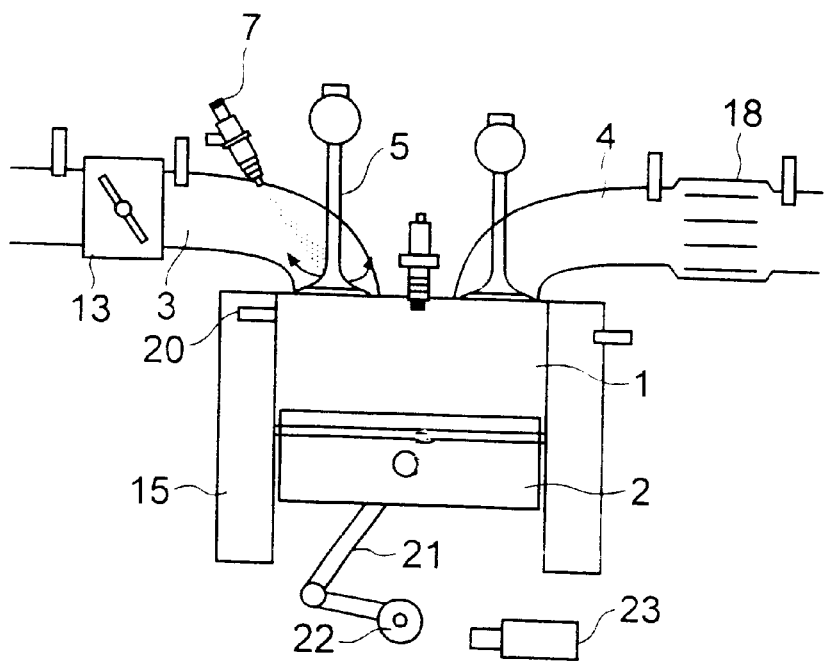
FIG. 26 is a view showing the behavior of fuel spray during high speed operation under control of the timing of ignition in dependence upon the timing of fuel injection in a compression ignition internal combustion engine of a port injection type to which the method of controlling the timing of ignition of the compression ignition engine of a premixed mixture type according to the present invention is applied.

Meanwhile, during high speed operation, as shown in FIG. 26, the fuel is injected from the fuel injection valve 7 during exhaust stroke. In this case, since the intake valve 5 is closed, the fuel sticks to the intake valve 5 so as to form a liquid film which is evaporated in the intake port 3 by a heat transmitted from the intake valve 5. Thus, the mixture gas is not cooled by the latent heat of evaporation of the fuel, and accordingly, the timing of ignition is advanced.

Figure 27:
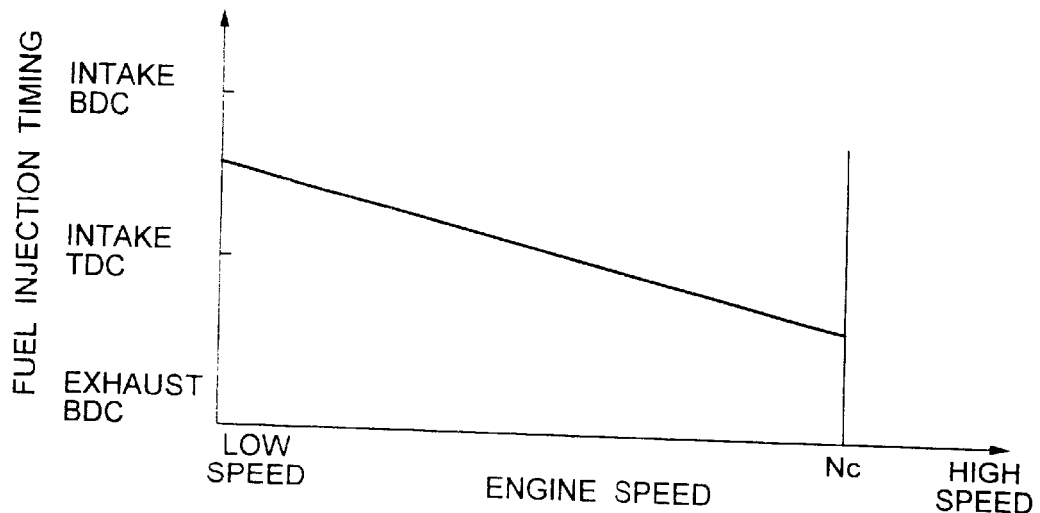
FIG. 27 is a view showing the characteristics of control of the timing of ignition due to the timing of fuel injection in dependence upon engine speed in the compression ignition internal combustion engine of a port injection type to which the method of controlling the timing of ignition of the compression ignition engine of a premixed mixture type according to the present invention is applied.

From a graph shown in FIG. 27, when the timing of fuel injection is continuously changed from intake stroke into exhaust stroke as the engine speed N increases, the rate of fuel evaporated by heat transmitted from the intake valve and the wall surface of the intake port and the rate of fuel evaporated in the combustion chamber can be continuously changed, and accordingly, the timing of injection can be finely controlled.

Next, explanation will be made of an embodiment of optimum control of the timing of ignition into which feed-back control is taken.

Figure 28:
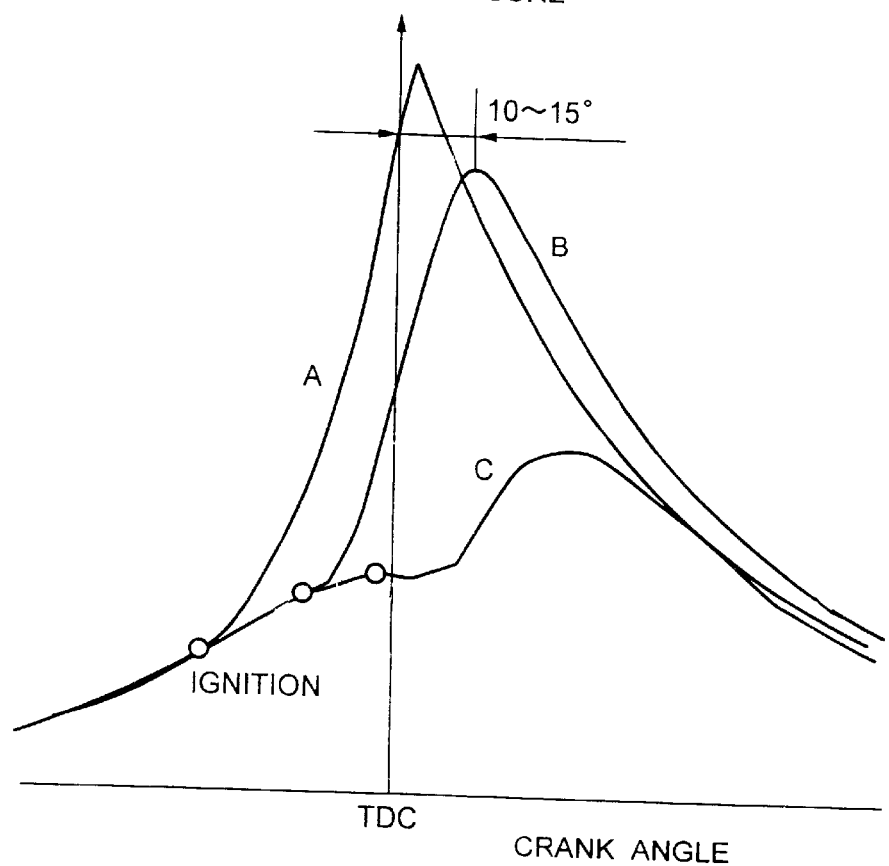
FIG. 28 is a view showing variation in cylinder pressure upon compression ignition combustion of a compression ignition type internal combustion engine to which the method of controlling the timing of ignition of the compression ignition engine of a premixed mixture type according to the present invention is applied.

FIG. 28 shows time variation in the cylinder pressure during compression ignition combustion.

The variation in pressure in the combustion chamber 1 is detected by the cylinder pressure sensor 20 shown in FIG. 1. Although the cylinder pressure of the combustion chamber 1 is increased as the fuel is burnt, positions of peaks of the cylinder pressure are different from one another. That is, for A in which ignition is early, the peak of the cylinder pressure occurs just after the top dead center (TDC) of compression but for C in which ignition is late, the peak of pressure occurs with a large lag from the top dead center, and the absolute value thereof becomes low. In general, since it has been known that the heat efficiency becomes highest if the position of the peak of the cylinder pressure comes to a position in a range from 10 to 15 deg. after the top dead center of compression, combustion with a high degree of efficiency can be made by controlling the timing of ignition so as to obtain a pressure waveform indicated by B.

Accordingly, in this embodiment, a crank angle Θ pmax at which the pressure becomes maximum is obtained from a pressure detection value from the cylinder pressure sensor 49 and a crank angle detection value from the crank angle sensor 23 as shown in FIG. 1 is obtained. If the Θ pmax is advanced from 10 to 15 deg. after the top dead center of compression, the timing of ignition is too early, and accordingly, the timing of fuel injection is shifted toward the bottom dead center so as to retard the timing of ignition from the present set timing. Accordingly, the volume of the fuel spray impinging upon the piston is decreased, thereby it is possible to decrease the degree of lowering of the temperature of the mixture gas due to the latent heat of evaporation so as to retard the timing of ignition, On the contrary, if the Θ pmax is retarded from 10 to 15 deg. after the top dead center of compression, the timing of ignition is too late, and accordingly, the timing of fuel injection is shifted toward the top dead center of intake from the present set timing in order to advance the timing of ignition. Accordingly, since the volume of the fuel spray impinging upon the piston is increased, the degree of the lowering of the temperature of the mixture gas due to the latent heat of evaporation of fuel is decreased. Thus, the timing of ignition can be advanced.

With the use of this method, the timing of ignition can be appropriately corrected in a batch for variation due to variation in the engine speed N, the ambient temperature, the cooling water temperature and the EGR volume, thereby it is possible to control the timing of ignition with a high degree of accuracy.

Figure 29:
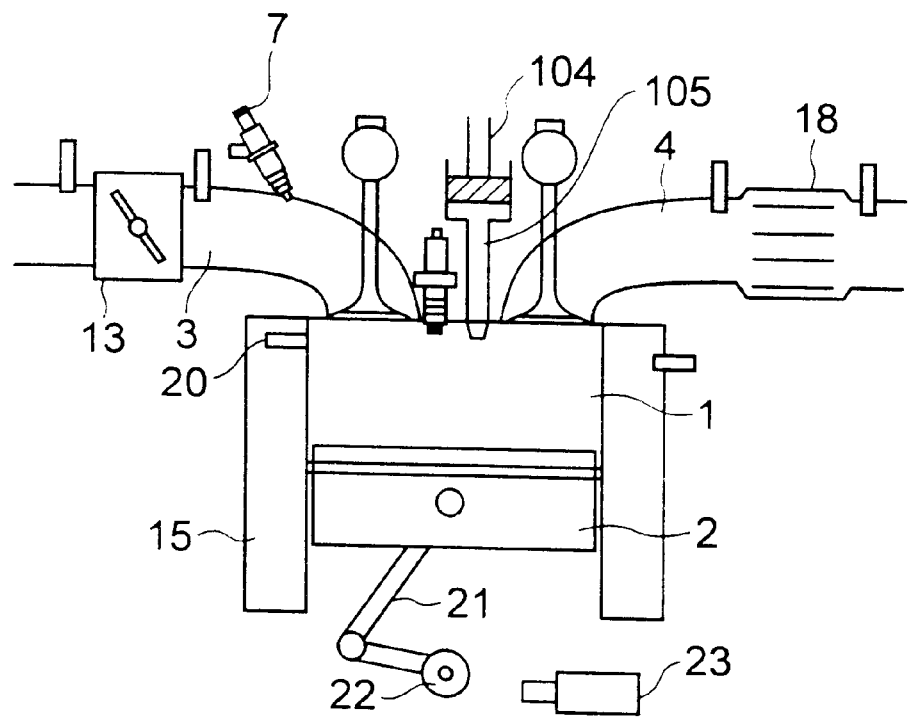
FIG. 29 is a view illustrating a mechanism for changing the compression ratio of the compression ignition type internal combustion engine to which the method of controlling the timing of ignition of the compression ignition engine of a premixed mixture type according to the present invention is applied.

Further, a parameter for controlling the timing of ignition through the detection of the e pmax, can be considered other than the timing of fuel injection. For example, an EGR volume by a valve changing mechanism or an external EGR, a heating value in the case of the provision of a device for heating intake air, a set value of fuel pressure in the case of the provision of a mechanism for changing the fuel pressure, a frequency of injection of fuel per cycle, or a set value of compression ratio in the case of the provision of a mechanism for changing the compression ratio is controlled so as to set their respective Θ pmax to a value in the rage of 10 to 15 deg. after the top dead center of compression, thereby it is possible to carry out compression ignition operation with a high degree of accuracy. It is noted that the mechanism for changing the compression ratio can be materialized by an auxiliary chamber 105 which is communicated with the combustion chamber 1 as shown in FIG. 29, and the volume of which is changed by moving an auxiliary chamber piston 104. The auxiliary chamber piston 104 can be displaced to an arbitrary position with the use of hydraulic pressure, pneumatic pressure or electromagnetic force.

Further, the control of the timing of ignition with the use of feed-back can be applied to the intake port injection type engine so as to control the timing of ignition so that the Θ pmax comes to a position in the range of 10 to 15 deg. after the top dead center of compression. That is, if the Θ pmax is advanced from 10 to 15 deg. after the top dead center of compression, the timing of ignition is too early, the timing of fuel injection is shifted toward the intake stroke side from the present set timing in order to retard the timing of ignition. Further, if the Θ pmax is retarded from the 10 to 15 deg. after the top dead center of compression, the timing of injection is tool late., and accordingly, the timing of fuel injection is shifted toward the exhaust stroke side from the present set timing in order to advance the timing of ignition, thereby it is possible to obtain an optimum timing of ignition.

Thus, during compression ignition operation, by increasing the volume of the fuel spray 100 impinging upon the wall surface of the combustion chamber as the engine speed is change from a low value to a high value, the mixture gas in the combustion chamber 1 is cooled by the latent heat of evaporation at a low engine speed so as to advance the timing of ignition, but since the evaporation of the fuel is made by heat transmitted from the wall surface of the combustion chamber 1 at a high speed, the evaporation cooling of the mixture gas in the combustion chamber 1 is decreased, and accordingly, the timing of ignition is advanced.

One of the means for changing the volume of the fuel spray 100 impinging upon the crown surface 2A of the piston shown in FIG. 30, is the timing of fuel injection, and in a compression ignition internal combustion engine of a premixed mixture type incorporating the fuel injection valve 7 for directly injecting fuel into the combustion chamber 1, the fuel is injected in the vicinity of the top dead center of compression when the engine speed is low during compression ignition operation, so as to decrease the volume of fuel sticking to the piston 2, but the fuel is injected in the vicinity of the top dead center of intake when the engine speed is high, so as to increase the volume of fuel sticking to the piston 2.

One of the means for changing the volume of the fuel spray 100 impinging upon the crown surface 2A of the piston shown in FIG. 30, is the timing of fuel injection, and in a compression ignition internal combustion engine of a premixed mixture type incorporating the fuel injection valve 7 for directly injecting fuel into the combustion chamber 1, the timing of fuel injection is advanced from the second half period of intake stroke to the first half period of intake stroke as the engine speed changes from a low value during compression ignition operation to a high value so as to continuously increase the volume of the fuel from a low engine speed to a high engine speed, thereby it is possible to finely control the timing of ignition.

One of the means for changing the volume of the fuel spray 100 impinging upon the crown surface 2A of the piston shown in FIG. 30, is the pressure of fuel injection, and in a compression ignition internal combustion engine of a premixed mixture type incorporating the fuel injection valve 7 for directly injecting fuel into the combustion chamber 1, the pressure of fuel injection is increased as the engine speed is changed from a low value to a high value during compression ignition operation so that the penetration of the spray is short at a low speed so as to decrease the volume of fuel sticking to the crown surface 2A of the piston 2, but the penetration of the spray is long at a high speed so as to increase the volume of fuel sticking to the crown surface 2A of the piston 2.

One of the means for changing the volume of the fuel spray 100 impinging upon the crown surface 2A of the piston shown in FIG. 30, is the frequency of injection, and in a compression ignition internal combustion engine of a premixed mixture type incorporating the fuel injection valve 7 for directly injecting fuel into the combustion chamber 1, the frequency of injection per cycle is decreased as the engine speed changes from a low value to a high value during compression ignition operation so that the penetration of the spray becomes longer in a high speed range in order to increase the volume of fuel sticking to the crown surface 2A of the piston 2.

Further, there is provided the fuel injection valve 7 for injecting fuel into the intake port, and the timing of injection for the fuel spray 100 is advanced from intake stroke injection to exhaust stroke injection as the engine speed is changed from a low value to a high value during compression ignition operation so that the fuel spray 100 is evaporated in the combustion chamber 1 at a low engine speed so as to lower the temperature of mixture gas due to latent heat, and at a high engine speed, the spray is evaporated by a heat transmitted from the intake valve 5 or the wall surface of the intake port 3 due to exhaust stroke injection so that the temperature of the mixture gas is not lowered. Thus, the ignition is retarded at a low speed but is advanced at a high speed.

Further, the timing of ignition is controlled so that the maximum value of the cylinder pressure during the compression ignition operation occurs in a range of 10 to 15 deg. after the top dead center of compression, thereby it is possible to obtain a highest heat efficiency.

In order to control the cylinder pressure of the combustion chamber 1 so that the maximum value of the cylinder pressure occurs in a range of 10 to 15 deg. after the top dead center of compression, there are a method of increasing and decreasing the volume of fuel sticking to the wall surface of the combustion chamber 1, a method of increasing or decreasing the value of heating intake air by the intake air heating means or a method of increasing and decreasing the EGR volume so as to change the temperature of the mixture gas.

In the compression ignition internal combustion engine of a premixed mixture type incorporating the fuel injection valve 7 for directly injecting fuel into the combustion chamber 1, in such a case that the crank angle at which the cylinder pressure of the combustion chamber 1 during compression operation become maximum is advanced from 10 to 15 deg. after the top dead center of compression, the timing of fuel injection during intake stroke is retarded so as to decrease the volume of fuel sticking to the crown surface 2A of the piston 2, and accordingly, the temperature of the mixture gas is lowered due to cooling by evaporation so as to retard the timing of ignition. Further, in such a case that the crank angle at which the cylinder pressure during compression operation becomes maximum is retarded from 10 to 15 deg. after the top dead center of compression, the timing of fuel injection during intake stroke is advanced so as to decrease the effect of cooling by evaporation in order to raise the temperature of the mixture gas, thereby it is possible to advance the timing of ignition.

In a compression ignition internal combustion engine of a premixed mixture type incorporating the fuel injection valve 7 for injecting fuel into the intake port, in such a case that the crank angle at which the cylinder pressure of the combustion chamber 1 during compression operation become maximum is advanced from 10 to 15 deg. after the top dead center of compression, the rate of fuel injection during intake stroke is increased so as to lower the temperature of the mixture gas due to cooling by evaporation, thereby it is possible to retard the ignition timing. Further, in such a case that the crank angle at which the cylinder pressure during compression operation becomes maximum is retarded from 10 to 15 deg. after the top dead center of compression, the rate of fuel injection during exhaust stroke is increased so as to reduce the effect of cooling by evaporation in order to raise the temperature of the mixture gas, thereby it is possible to advance the timing of ignition.

In a compression ignition internal combustion engine of a premixed mixture type incorporating the fuel injection valve 7 for directly injecting fuel into the combustion chamber 1, in such a case that the crank angle at which the cylinder pressure of the combustion chamber 1 during compression operation become maximum is advanced from 10 to 15 deg. after the top dead center of compression, the pressure of fuel injection is decreased so as to be shorten the penetration of the fuel spray, and accordingly, the volume of fuel sticking to the crown surface of 2A of the piston is increased so as to retard the timing of ignition due to cooling by evaporation of he mixture. Further, in such a case that the crank angle at which the cylinder pressure during compression operation becomes maximum is retarded from 10 to 15 deg. after the top dead center of compression, the pressure of fuel injection during intake stroke is increased so that the penetration of the spray becomes longer in order to increase the volume of fuel sticking to the crown surface 2A of the piston 2, and as a result, the cooling by evaporation of the mixture gas is decreased so as to advance the timing of ignition.

In a compression ignition internal combustion engine of a premixed mixture type incorporating the fuel injection valve 7 for directly injecting fuel into the combustion chamber 1, in such a case that the crank angle at which the cylinder pressure of the combustion chamber 1 during compression operation become maximum is advanced from 10 to 15 deg. after the top dead center of compression, the frequency of fuel injection per cycle is increased so that the penetration of the spray is shortened in order to decrease the volume fuel sticking to the crown surface 2A of the piston 2, and as a result, the timing of ignition can be retarded due to the cooling by evaporation of the mixture gas. Further, in such a case that the crank angle at which the cylinder pressure of the combustion chamber 1 during compression operation become maximum is retarded from 10 to 15 deg. after the top dead center of compression, the frequency of fuel injection per cycle is decreased so that the penetration of the spray is increased in order to increase the volume fuel sticking to the crown surface 2A of the piston 2, and as a result, the cooling of evaporation of the mixture gas is decreased so as to advance the timing of ignition.

In a compression ignition internal combustion engine of a premixed mixture type incorporating an intake air heating device in the upstream part of the intake port 3, in such a case that the crank angle at which the cylinder pressure of the combustion chamber 1 during compression operation become maximum is advanced from 10 to 15 deg. after the top dead center of compression, the heating value of the intake air heating device is decreased so as to lower the temperature of the mixture gas, thereby it is possible to retard the timing of ignition. Further, in such a case that the crank angle at which the cylinder pressure of the combustion chamber 1 during compression operation become maximum is retarded from 10 to 15 deg. after the top dead center of compression, the heating value of the intake air heating device is increased so as to raise the temperature of the mixture gas, thereby it is possible to advance the timing of ignition.

In a compression ignition internal combustion engine of a premixed mixture type incorporating an EGR supply means or an intake valve changing means, in such a case that the crank angle at which the cylinder pressure of the combustion chamber 1 during compression operation become maximum is advanced from 10 to 15 deg. after the top dead center of compression, the EGR volume by the EGR supply means or the exhaust valve changing means is decreased so as to lower the temperature of the mixture gas, thereby it is possible to retard the timing of ignition. Further, in such a case that the crank angle at which the cylinder pressure of the combustion chamber 1 during compression operation become maximum is retarded from 10 to 15 deg. after the top dead center of compression, the EGR volume by the EGR supply means or the exhaust valve changing means is increased so as to raise the temperature of the mixture gas, thereby it is possible to advance the timing of ignition.

In a compression ignition internal combustion engine of a premixed mixture type incorporating a means for changing the compression ratio, in such a case that the crank angle at which the cylinder pressure of the combustion chamber 1 during compression operation become maximum is advanced from 10 to 15 deg. after the top dead center of compression, the compression ratio is decreased by the compression ratio changing means so as to lower the temperature of the mixture gas during compression stroke, thereby it is possible to retard the timing of ignition. Further, in such a case that the crank angle at which the cylinder pressure of the combustion chamber 1 during compression operation become maximum is retarded from 10 to 15 deg. after the top dead center of compression, the compression ratio is increased by the compression ratio changing means so as to raise the temperature of the mixture gas during compression stroke, thereby it is possible to advance the timing of ignition.

Since the maximum penetration of the spray which is injected into a free space in such a condition that the air pressure of air, the air temperature, the fuel pressure and the fuel volume are the same as those during the timing of compression ignition from the fuel injection valve 7, is set in a range from 70 to 90% of the stroke length of the piston, and accordingly, the fuel injected into the combustion chamber in the vicinity of the bottom dead center of intake stroke does not impinges upon the crown surface 2A of the piston 2 so that the cooling effect of the mixture gas due to the latent heat of evaporation of fuel can be utilized at maximum. Further, in such a case that the fuel is injected in the first half period of intake stroke, a part of the spray impinges upon the piston so as to reduce the effect of cooling by evaporation, thereby it is possible to raise the temperature of the mixture gas.

When the maximum penetration of the spray which is injected into a free space in such a condition that the air pressure of air, the air temperature, the fuel pressure and the fuel volume are the same as those during the timing of compression ignition from the fuel injection valve 7, is set in a range from 70 to 90% of the stroke length of the piston, the transverse width of the spray is set in a range of 90 to 100% of the bore diameter, the fuel can be prevented from sticking to the bore wall in the case of injecting the fuel into the combustion chamber 1 in the vicinity of the bottom dead center of intake stroke, thereby it is possible to prevent dilution of oil and emission of unburnt HC. Further, in the case of fuel impinging to the piston, the fuel is stick to the crown surface 2A of the piston 2 over a wide area, the thickness of the liquid film become thin, thereby it is possible to prevent emission of soot and unburnt HC, and deterioration of evaporation of the fuel.

As the intake air temperature, the engine cooling water temperature and the EGR volume increase, by making such correction that the timing of fuel injection in the high engine speed range during compression ignition operation is shifted toward the bottom dead center of intake, it is possible to prevent the timing of ignition during high engine speed operation from being advanced due to variation in the above-mentioned condition.

As the intake air temperature, the engine cooling water temperature and the EGR volume increase, by making such correction that the pressure of fuel injection in a high engine speed range during compression ignition operation is decreased, it is possible to prevent the timing of ignition from being advanced from its optimum timing of ignition due to variation in the condition.

By forming the crown surface 2A of the piston 2 from a material having a heat capacity which is larger than that of the piston 2 body, the temperature of the crown surface 2A of the piston 2 becomes higher, and accordingly, the fuel sticking to the crown surface 2A of the piston 2 can be surely evaporated during compression ignition operation.

In the method of controlling the timing of ignition of a compression ignition engine of a premixed mixture type, according to the present invention, with the control of the temperature of the mixture gas with the use of latent heat of evaporation of the fuel, the timing of ignition during compression ignition operation in a compression ignition internal combustion engine can be optimumly controlled in accordance with an operating condition of the engine.

Further, with the method of controlling the timing of ignition of a compression ignition engine of a premixed mixture type, according to the present invention, the timing of ignition is set through feed-back control so as to set the crank angle at which the cylinder pressure becomes maximum in order that the heat efficiency becomes highest, thereby it is possible to always carry out combustion with a high degree of heat efficiency even with disturbance such as variation in the ambient temperature or cooling water temperature.

Further, with the method of controlling the timing of ignition of a compression ignition engine of a premixed mixture type, according to the present invention, it is possible to materialize a compression ignition internal combustion engine having an extremely small emission of NOx, and having a high degree of heat efficiency at a low cost.

It should be further understood by those skilled in the art that the foregoing description has been made on embodiments of the invention and that various changes and modifications may be made in the invention without departing from the spirit of the invention and the scope of the appended claims.

What is claimed is:

1. A control apparatus in a compression ignition internal combustion engine of a premixed type in which a premixed mixture gas is ignited under compression by a piston, wherein a volume of fuel spray impinging upon an inner wall surface of a combustion chamber is controlled so as to be continuously or stepwise increased as engine speed is changed from a low value to a high value; in a compression ignition operation range in order to adjust the crank angle with which the pressure of the combustion chamber becomes maximum for improving the engine thermal efficiency.

2. A control apparatus in a compression ignition internal combustion engine of a premixed mixture type in which a premixed mixture gas is ignited under compression by a piston, including a fuel injector for injecting fuel into an intake port through which air is fed into a combustion chamber wherein the timing of injection of fuel spray from the injector into the intake port is continuously or stepwise advanced from air-intake stroke injection to exhaust stroke injection as engine speed is changed from a low value to a high value, in a compression ignition operation range.

3. A control apparatus in a compression ignition internal combustion engine of a premixed mixture type in which a premixed mixture gas is ignited under compression by a piston, including a pressure sensor for detecting a pressure in a combustion chamber and a crank angle sensor for detecting a rotating angle of a crank shaft, wherein the timing of ignition is controlled so as to cause a maximum value of the pressure in the combustion chamber, detected by the pressure sensor, to fall in a range from 10 to 15 deg. after a top dead center of compression, in a compression ignition range.

4. A control apparatus in a compression ignition internal combustion engine of a premixed mixture type, which receives outputs from a pressure sensor for detecting a pressure in a combustion chamber, a crank angle sensor for detecting a rotating angle of a crank shaft, and which controls the timing of ignition so as to cause a maximum value of the pressure in the combustion chamber, detected by the pressure sensor, to fall in a range from 10 to 15 deg. after a top dead center of compression in a compression ignition range.

* * * * *